(12) United States Patent
Guo et al.

(10) Patent No.: US 8,665,063 B2
(45) Date of Patent: Mar. 4, 2014

(54) NEIGHBOR DISCOVERY TECHNIQUES

(75) Inventors: Dongning Guo, Chicago, IL (US); Jun Luo, Evanston, IL (US)

(73) Assignee: Northwestern University, Evanston, IL (US)

( * ) Notice: Subject to any disclaimer, the term of this patent is extended or adjusted under 35 U.S.C. 154(b) by 477 days.

(21) Appl. No.: 12/924,413

(22) Filed: Sep. 27, 2010

(65) Prior Publication Data

US 2011/0121949 A1    May 26, 2011

Related U.S. Application Data

(60) Provisional application No. 61/277,573, filed on Sep. 25, 2009, provisional application No. 61/395,222, filed on May 10, 2010, provisional application No. 61/372,449, filed on Aug. 10, 2010.

(51) Int. Cl.
*G05B 23/00* (2006.01)

(52) U.S. Cl.
USPC ........................................... 340/5.61

(58) Field of Classification Search
USPC ............... 340/10.2, 5.61, 7.24; 370/337, 342; 455/561
See application file for complete search history.

(56) References Cited

U.S. PATENT DOCUMENTS 7,747,223 B2 *   6/2010  Wilson et al. ............... 455/67.11
2007/0286136 A1 * 12/2007  Rittle et al. ................... 370/338

* cited by examiner

*Primary Examiner* — Vernal Brown
(74) *Attorney, Agent, or Firm* — Klintworth & Rozenblat IP LLC

(57) ABSTRACT

A system including a number of wireless communication nodes spaced apart from one another. The nodes are structured to transmit and receive unique signatures. A neighborhood of nodes may be discovered based on the unique signatures.

33 Claims, 14 Drawing Sheets

$$Y = \underline{S}X, \quad \text{i.e.,} \quad Y_l = \bigvee_{n=1}^{N} S_{mn} X_n$$

$$\begin{bmatrix} 1 \\ 1 \\ 0 \\ \vdots \\ 0 \\ 0 \\ 1 \end{bmatrix} = \begin{bmatrix} 1 & 1 & 0 & 0 & & 0 & 0 & 0 \\ 1 & 0 & 0 & 1 & \cdots & 0 & 1 & 0 \\ 0 & 1 & 1 & 0 & & 0 & 0 & 1 \\ \vdots & & & & \ddots & & & \vdots \\ 0 & 0 & 1 & 0 & & 0 & 0 & 1 \\ 0 & 0 & 0 & 0 & \cdots & 1 & 0 & 0 \\ 1 & 0 & 0 & 0 & & 0 & 1 & 0 \end{bmatrix} \begin{bmatrix} 1 \\ 0 \\ 0 \\ 0 \\ \vdots \\ 0 \\ 1 \\ 0 \end{bmatrix}$$

*Fig. 7*

A Direct Algorithm

NEIGHBOR DISCOVERY TECHNIQUES

CROSS REFERENCE TO RELATED APPLICATIONS

The present application claims the benefit of U.S. Provisional Patent Applications No. 61/277,573, filed Sep. 25, 2009, No. 61/395,222, filed May 10, 2010, and No. 61/372,449, filed Aug. 10, 2010, and the same are incorporated herein by reference in their entirety.

GOVERNMENT RIGHTS

This invention was made with government support under grant number W911NF-07-1-0028 (Subcontract Number UTA06-790/A2) awarded by the Army Research Office. The government has certain rights in the invention.

BACKGROUND

The present application relates to communication techniques, and more particularly, but not exclusively, relates to techniques to determine which devices among a population of distributed wireless communication devices are within a communication range of a particular device. These techniques find application in Mobile Ad hoc Networks (MANETs), nonmobile networks, and other communication systems.

In a typical wireless network, each node is given one or more unique physical addresses to identify its network interface(s). An example is a peer-to-peer network which uses MAC addresses to identify nodes in the network. In order to send data across a wireless network, each communicating party acquires the network interface addresses of its communicating peers in its neighborhood, with which the node has a direct link.

Neighborhood discovery by nodes in ad hoc networks often makes use of random access techniques. In one scheme, a query node sends a beacon signal and each node in the neighborhood transmits a frame which contains its network interface address after a random delay. A random delay is used to avoid collision of transmissions of neighboring nodes. Still, collisions occur because coordination is generally not possible before each node determines its neighborhood. Thus several retransmissions after random delays are typically used in wireless networks. As a result, it often takes a fairly large total delay to guarantee accurate enough discovery. Such random access neighbor discovery protocols have been specified for the ad hoc mode of IEEE 802.11 standards as well as for generic mobile ad hoc networks by the IETF MANET working group. Various extensions of the basic idea have been proposed, including the "birthday protocol," which allows simultaneous discovery by all terminals of their respective neighborhoods, as well as schemes using directional antennas.

Even so, there remains a need for faster ways to perform neighbor discovery. Accordingly, further contributions are needed in this area of technology.

SUMMARY

One embodiment of the present application is directed to a unique communication technique. Other embodiments include unique methods, systems, devices, and apparatus involving wireless communications. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein:

FIGS. 6-10 are diagrammatic views demonstrating the application of an algorithm that may be executed by the wireless communication devices of the system of FIG. 1.

DETAILED DESCRIPTION OF REPRESENTATIVE EMBODIMENTS

Figure 1:
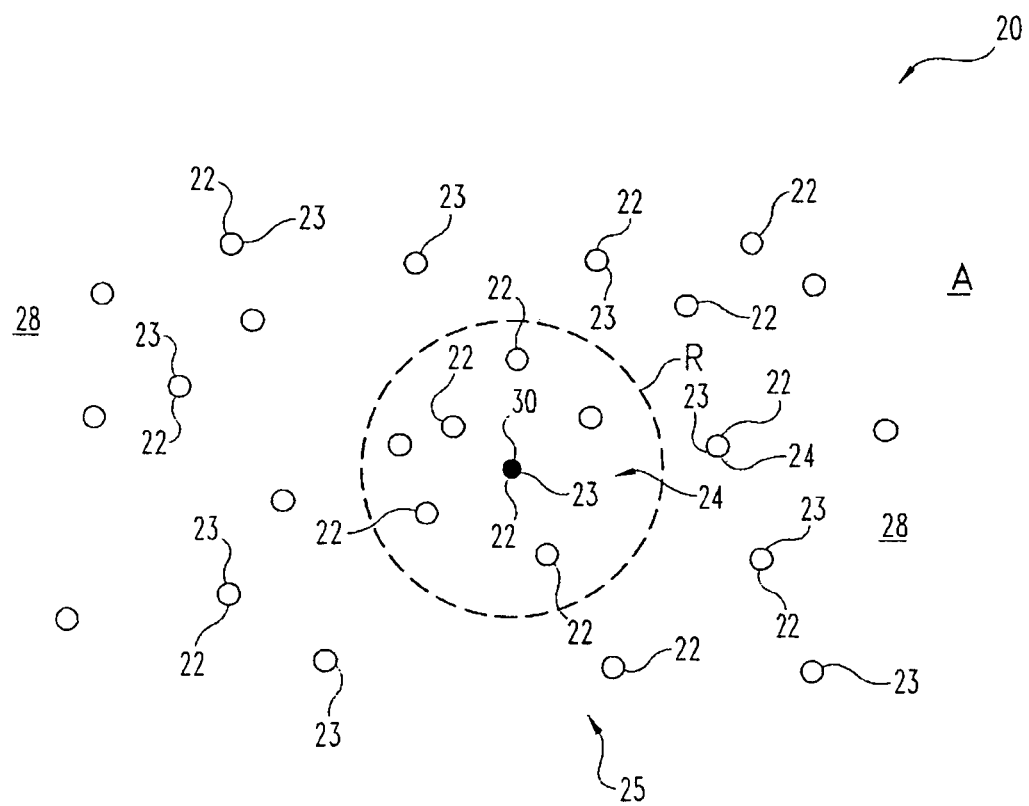
FIG. 1 is diagrammatic view of a system including a population of wireless communication devices operable to define an ad hoc communication network.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In one embodiment of the present application a communication system and technique is described called rapid on-off-division duplex ("RODD"). In RODD, a number of wireless communication devices are spaced apart form one another over an area. These devices each have a unique identifier with an energy-varying pattern relative to a sequence of time intervals (slot). To discover the devices within its communication range, one of the devices prompts transmission of the identifiers from the other devices. Typically, the number of neighboring devices within this range is considerably less than the total number of devices in the population. Those responses that are transmitted are combined in a numerical representation. In one form, this representation is a binary sequence of bits with each bit corresponding to the energy level for a different time interval. For each of the time intervals, this representation is processed to determine if it corresponds to a received energy level above a selected threshold. Based on this processing, those devices for which a higher energy level would be expected if they were within the communication range then that observed, are excluded, leaving a subset of the devices that have a high probability of being within the communication range of the prompting device.

In another embodiment, a set of deterministic signatures is generated based on a Reed-Muller code, which may be used for sparse recovery. The corresponding chirp decoding algorithm has sub-linear complexity, which is computationally feasible even with $2^{32}$ or $2^{65}$ nodes in the network. However, the signatures are not sparse, which prohibits a transmitting node from listening and decoding its neighborhood. It has been discovered that when compressed neighbor discovery is compared with random-access schemes, it can be shown to require much fewer transmissions to achieve the same error performance. In addition, this embodiment generally entails relatively less transmission overhead, because it generally takes a single frame of transmission, as opposed to many frame transmissions in random access.

In another embodiment, nodes in a computer network use the RODD neighbor discovery technique when the number of nodes is at or below a threshold. When the number of nodes is above the threshold, then the nodes use the deterministic signatures based on Reed-Muller codes for neighborhood discovery.

Neighbor discovery is applicable in MANETs, which are self-organizing networks without pre-existing infrastructure. Neighbor discovery also arises in infrastructure networks due to development of heterogeneous cellular networks with unsupervised picocells and femtocells, for example.

In another embodiment, each node is assigned an on-off signature (i.e., a sequence of staggered pulses) over the (slotted) discovery interval. The number of on-slots is a small fraction of the total number of slots, so that the signature is sparse. The superposition of the signatures of all neighbors is a denser sequence of pulses, in which a pulse is seen at a slot if at least one of the neighbors sent a pulse during the slot. A simple decoding procedure via eliminating non-neighbors is developed based on algorithms originally introduced for group testing. Each node can receive signals from its neighbors during its own off-slots, so that all nodes can simultaneously discovery their respective neighborhood despite the half-duplex constraint.

Another embodiment describes using on-off signaling to achieve full-duplex neighbor discovery using half-duplex radios, which departs from conventional schemes where a user's transmitting slots are scheduled away from its own receiving slots.

Another embodiment describes the decoding algorithm for on-off signatures and improves the performance of the group-testing-based algorithms for noiseless and Rayleigh fading channels, respectively. Bounds are also developed for the error probability in order to optimize the design.

Another embodiment describes using Reed-Muller codes for neighbor discovery, which enables efficient discovery for networks of generally any practical size.

Another embodiment considers a more realistic network modeled by a Poisson point process, and a more realistic propagation model with path loss in contrast to previous systems which models a small neighborhood around the query node.

Another embodiment demonstrates discovery of 50 neighbors or so at low signal-to-noise ratio ("SNR") in contrast to prior systems which demonstrated reliable discovery at high SNR for a relatively sparse network where the average number of neighbors is less than ten.

FIG. 1 illustrates system 20 of another embodiment of the present application. System 20 includes a number of wireless communication devices 22 distributed over an area of interest A. Devices 22 are structured to participate as a communication node 23 of a communication network 25 to be defined by system 20 as further described hereinafter. Only a few of devices 22 and nodes 23 are specifically designated by reference numerals in FIG. 1 to preserve clarity.

Devices 22 are spaced apart from each other and may be remote from one another. Typically, only a subset 24 of devices 22 is within a wireless communication range R of a given device 22. As used herein, "wireless communication range" refers to the nominal range over which wireless communications can occur directly between two wireless communication devices without being relayed or repeated through a third device spaced apart from either of the others. Conversely, another subset 28 of devices 22 is outside the indicated wireless communication range R.

For demonstration purposes, an exemplary device 22 is further indicated and designated by reference numeral 30 to enhance clarification—it being understood that any other of devices 22 could be so designated. Devices 22 may communicate via any wireless signal type, such as Radio Frequency (RF), InfraRed (IR), acoustic signal waveform (sonic and/or ultrasonic), visible light, and/or other varieties known to those skilled in the art. In addition to wireless communication links/interfaces, some or all of devices 22 may be equipped with "wired" or cable-based communication links/interfaces.

Devices 22 may be of any form or implementation, including without limitation, spontaneous social networking, building and other environmental monitoring, disaster relief, military battlefield communications and logistics monitoring, cellular telephone communications, Personal Digital Assistant (PDA) networking, RFID tag applications, wireless computer networks, inventory tracking equipment, and/or other equipment or applications as would occur to those skilled in the art.

Figure 2:
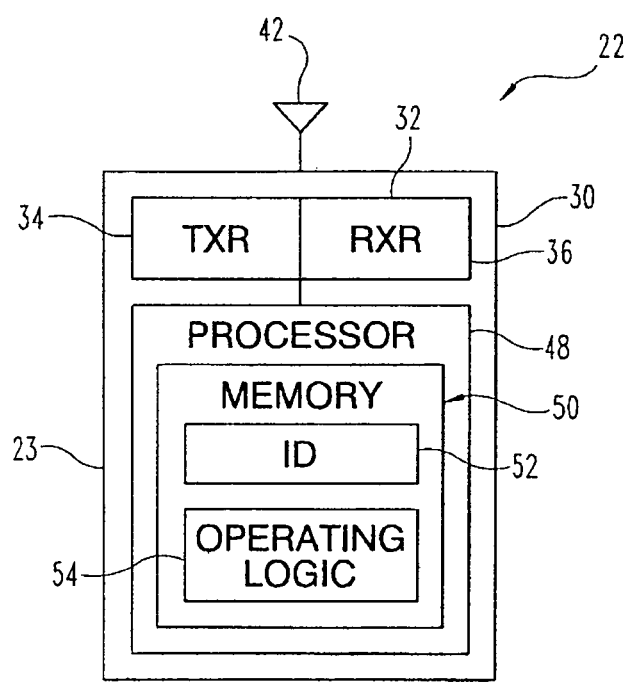
FIG. 2 is a schematic view of one of the devices of the system of FIG. 1.

Referring additionally to FIG. 2, further details of device 30 are depicted that also apply to each of the other devices 22. Device 30 includes a transmitter (TXR) 34 and a receiver (RXR) 36 integrated to define a transceiver 32. In other embodiments, transmitter 34 and receiver 36 may be separate from one another. Device 30 further includes a processing device 48 in operative communication with transceiver 32. Processing device 48 includes memory 50. Memory 50 stores a unique binary identifier (ID) 52 (alternatively designated a signature) that may be used to distinguish devices 22 from one another (as further described hereinafter). Furthermore, processing device 48 executes operating logic 54 to perform various routines with device 22, including those further described as follows.

Transceiver 32 sends communication signals to and receives communication signals from antenna 42, and communicates with processing device 48 to provide desired encoding of information/data in the signals, as might be desired for various applications of system 20. Processing device 48 includes appropriate signal conditioners to transmit and receive desired information (data), and correspondingly may include filters, amplifiers, limiters, modulators, demodulators, CODECs, signal format converters (such as analog-to-digital and digital-to-analog converters), clamps, power supplies, power converters, and the like as needed to perform various control, communication, and regulation operations described herein. Processing device 48 can be comprised of one or more components of any type suitable to process the signals received from transceiver 32 or elsewhere, and provide desired output signals. Such components may include digital circuitry, analog circuitry, or a combination of both. Processing device 48 can be of a programmable type; a dedicated, hardwired state machine; or a combination of these; and can further include multiple processors, Arithmetic-Logic Units (ALUs), Central Processing Units (CPUs), or the like. For forms of processing device 48 with multiple processing units, distributed, pipelined, and/or parallel processing can be utilized as appropriate. Processing device 48 may be dedicated to performance of just the operations described herein or may be utilized in one or more additional applications. In the depicted form, processing device 48 is of a programmable variety that executes algorithms and processes data in accordance with operating logic 54 as defined by programming instructions (such as software or firmware) stored in memory 50. Alternatively or additionally, operating logic 54 for processing device 48 is at least partially defined by hardwired logic or other hardware.

Memory 50 may be of one or more types, such as a solid-state variety, electromagnetic variety, optical variety, or a combination of these forms. Furthermore, memory 50 can be volatile, nonvolatile, or a mixture of these types, and some or all of memory 50 can be of a portable variety, such as a disk, tape, memory stick, cartridge, or the like. In addition to identifier 52, memory 50 can store data that is manipulated by the operating logic 54 of processing device 48, such as data representative of signals received from and/or sent to transceiver 32 in addition to or in lieu of storing programming instructions defining operating logic 54, just to name one example.

Operating logic 54 of each device 22 cooperates to define an ad hoc network 25 with nodes 23. In network 25, a given node 23 may have a direct radio link with only a small number of nearby nodes 23, which are referred to as its "neighbors"— these neighbors being those nodes 23 (devices 22) within the communication range of the given node 23 (such as device 30). In the absence of a central controller, it is desired that each node 23 discover and identify the network interface address of its neighboring nodes 23 before efficient routing or other higher-layer activities can take place as applicable. Among the routines by which nodes 23 define network 25 include a routine that acquires neighboring node 23 information for a given node 23. This routine may be repeated by different nodes 23 until a network 25 is adequately defined with respect to all nodes 23 of interest.

In one approach, discovery of neighboring nodes 23 (neighbor discovery) is to identify, out of a list of all candidate nodes 23, which ones are neighbors based on the received signal. Typically, non-neighbors either do not respond, or their signals are received well below noise level and can be ignored. The received signal can be regarded as a certain number of measurements over time, which may be defined in terms of a sequence of consecutive time intervals or slots— such that there is one measurement per slot. To reduce the cost and/or overhead of neighbor discovery, one would like to use as short transmissions, i.e., as few measurements as possible. While collisions in existing random-access discovery schemes are typically undesired, nonetheless, superposition of multiple signals can contain useful information. It has been surprisingly discovered that superimposed responses of neighboring nodes 23 to a querying node 23 can provide a desired way of performing neighbor discovery with communications taking place over what may be modeled as a type of multi-access channel.

For this form of neighbor discovery routine, assign each node 23 a unique signature frame or waveform. Upon receipt of a probe frame from a querying one of the nodes 23, all neighbors respond by sending their signatures simultaneously. Operating logic 54 of the query node 23 is executed with processing device 48 to infer which signatures constitute the received superposition, assuming by design that it knows all the signatures of nodes 23 of interest for the network 25. In fact random-access neighbor discovery can be regarded as a special case, where the signature of each node comprises repeated, randomly delayed versions of its identity with additional redundancy.

The processing of simultaneously received signature information can be applied to provide a desirably efficient neighbor discovery scheme for MANETs, and further additive white Gaussian noise, arbitrary fading, and path-loss attenuation may be readily taken into account. As an initial matter, it should be appreciated that the received signatures are subject to random, independent amplitudes and phases, which are unknown to the query node 23. In one embodiment, a binary, on-off signature over a slotted period of time (i.e., each signature is a sequence of pulses over a number of consecutive time intervals (slots)) is utilized, such that the signature appears to be somewhat sparse. For this embodiment, the superposition of responses corresponds to a train of pulses, in which a pulse is seen at a slot if and only if at least one of the neighbors sent a pulse during the slot (that may be corrupted by Gaussian noise). By comparing the amplitude of the noisy received signal with a threshold, it can be determined (noncoherently) whether a pulse is seen in each slot. The query node 23 then determines, out of the signatures of all nodes 23 in the network 25, which ones belong to neighbors by method of elimination, that is: for each slot with no pulse received, all nodes that would have transmitted a pulse during that slot are eliminated; and the surviving nodes after such elimination are regarded as neighboring nodes 23.

In implementations where a very low error probability is desired, a relatively high signal-to-noise ratio (SNR) may be needed, because the pulses of two neighbors sometimes cancel during a slot so that both neighbors are eliminated. A careful examination reveals that typically many slots point correctly to the elimination of non-neighbors, whereas only one or a few slots point erroneously to the elimination of neighbors. For such implementations, it has been surprisingly discovered that a significant performance improvement is achieved by requiring that elimination of a node occur if at least two slots point to it. For instance, for a 10,000-node network where each node has five neighbors on average, the probability of identifying a neighborhood incorrectly is smaller than 1% if 1,500-bit signatures are used at SNR of 26 dB. In contrast, random-access neighbor discovery typically requires many thousand more bits.

The superimposed responses of nodes received by the querying node can be modeled as a noisy linear combination of the signatures of all nodes, with zero coefficient on each signature of a non-neighbor, and with a random nonzero coefficient on each signature of a neighbor. For neighbor discovery, it would be desirable to invent the linear system to identify which coefficients are nonzero. It turns out that this system can be inverted accurately by using also the a priori knowledge that the vector of coefficients is extremely sparse, because typically only a tiny fraction of nodes in a large network are neighbors of any node. In one preferred embodiment the number of neighboring nodes is no more than one tenth of the total number of nodes. In a more preferred embodiment the number of neighboring nodes is no more than one hundredth of the total number of nodes. In an even more preferred embodiment the number of neighboring nodes is no more than one thousandth of the total number of nodes.

Two types of errors are possible: If an actual neighbor is eliminated by the algorithm, it is called a miss. On the other hand, if a non-neighbor survives the algorithm and is thus declared a neighbor, it is called a false alarm. The rate of miss (resp. rate of false alarm) is defined as the average number of misses (resp. false alarms) in one node's neighborhood divided by the average number of neighbors the node has.

In one embodiment, a signature detection algorithm is based on group testing. This group testing algorithm is performed with noncoherent processing as described in Algorithm 1, as follows:

---
Algorithm 1 Elimination Algorithm
---
1: input: Y, $\underline{S}$ and T
2: Initialize: $V \leftarrow \{1, \ldots, N\}$
3: for i = 1 to M do
4:  if $|Y_m|^2 < T$ then
5:   $V \leftarrow V \setminus \{n: S_{m,n} = 1\}$
6:  end if
7: end for
8: Output: mark all nodes in V as neighbors
---

Figure 3:
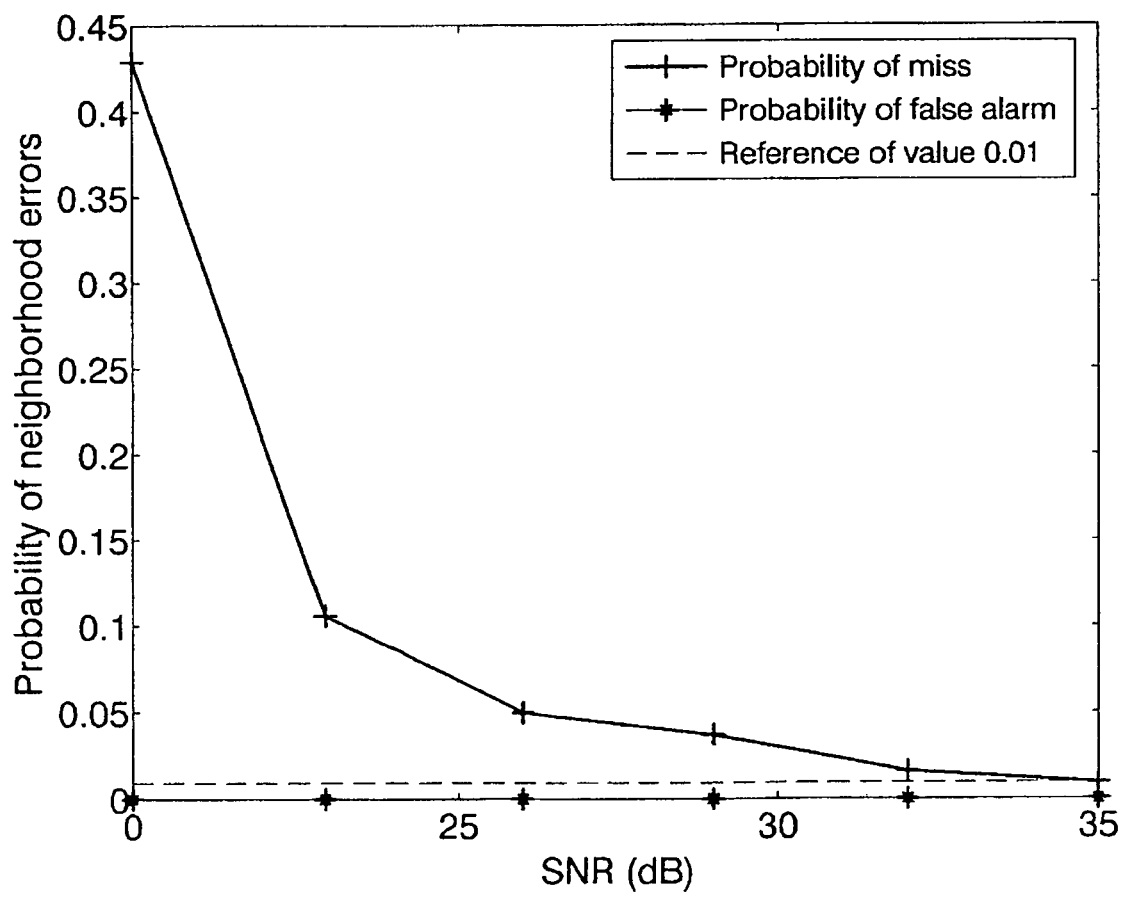
FIG. 3 is a plot of probability of neighborhood error versus SNR with no false alarm registered, so the corresponding error probability is numerically zero. The parameters are: N=10,000, c=5, M=1,500, q=0.0247, and T=1.0.

Algorithm 1 has been experimentally simulated for a system with N=10,000 nodes other than node 0 on an average c=5 neighbors, Rayleigh fading and the path-loss parameter α set to 3, M=1,500, T=1.0 and q=0:0247. These parameters imply a 1,500-bit signature that has about 37 pulses on average. FIG. 3 plots the two types of error rates for neighbor discovery against the SNR. In particular, no false alarms are registered so that the false alarm rate is effectively zero. In fact, once the SNR exceeds a few dB, the false alarm rate is extremely insensitive of the SNR. The probability of miss decays with the SNR and drops to about 0.01 at 35 dB. If the SNR is 23 dB or lower, the error probability is greater than 0.1, which may be unacceptable for some applications. Such unacceptable circumstances can be addressed as follows:

While the level of false alarms is relatively low for typical parameters, it is instructive to examine what are the main causes of the misses. Accordingly, for each node eliminated, the number of slots which point to its elimination are recorded (designated herein as "strikes"). The average number of nodes (out of a 10,000 total for the simulation) that received 0, 1, 2, . . . , strikes are plotted in FIG. 3 separately for neighbors and non-neighbors. For example, most neighbors receive no strike, but a small number of them receive 1, 2 or 3 strikes. In contrast, most non-neighbors receive dozens of strikes, whereas a small number of non-neighbors receive less than 5 strikes. Put it in another way, a neighbor who is eliminated receives mostly one strike, and sometimes two strikes, whereas most non-neighbors receive many more strikes. This distinction is believed to result from the sparseness of the signatures.

Figure 4:
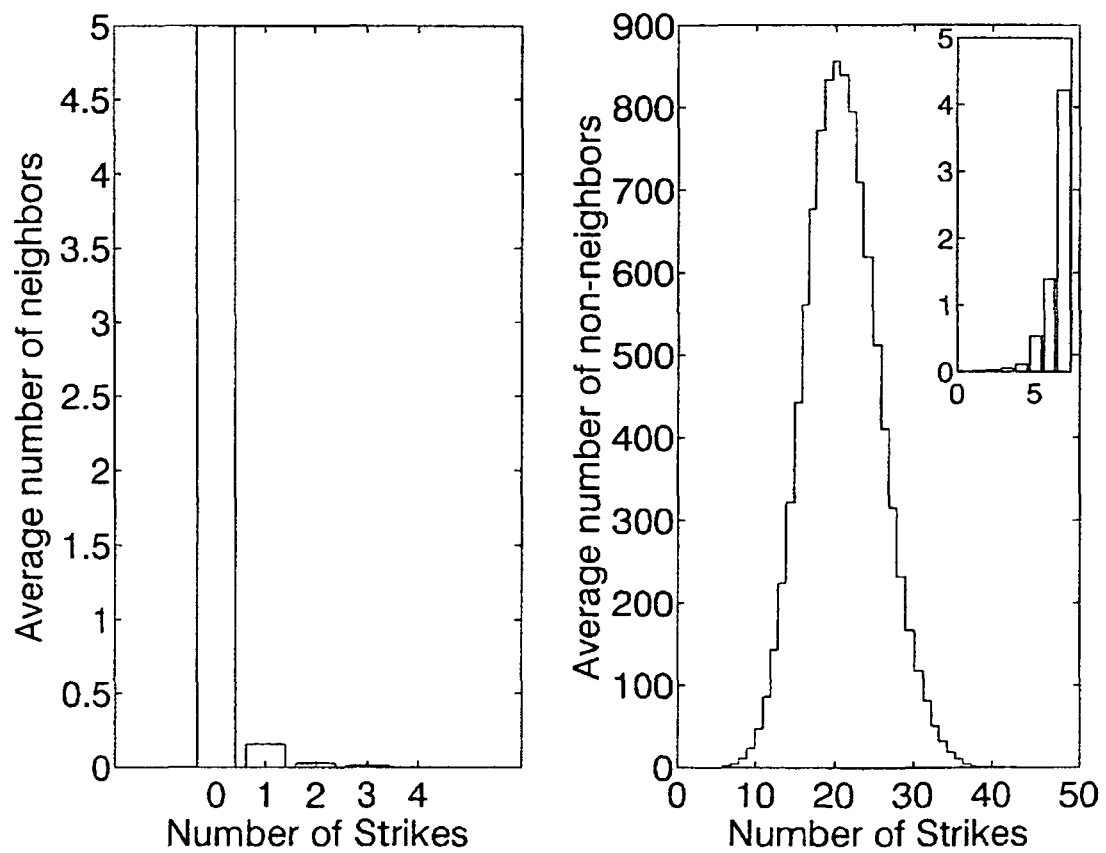
FIG. 4 is a graphical representation of nodes categorized by the number of strikes they receive. The plot shows the average number of nodes (out of 10,000 total) versus the number of strikes received. The inlet plot blows up the left-side tail of the plot.

FIG. 4 is a graphical representation of nodes categorized by the number of strikes they receive. The plot shows the average number of nodes (out of 10,000 total) versus the number of strikes received. The inlet plot blows up the left-side tail of the plot.

In a further embodiment, Algorithm 1 is adjusted to account for implementations where the level of misses is unacceptable as exemplified by Algorithm 2. For this embodiment, instead of eliminating a node as soon as it receives a single strike, elimination occurs only if it receives at least k strikes. Algorithm 2 is set forth as follows:

---
Algorithm 2 k-strike Group Testing with Noncoherent Processing
---
1: Input: Y, $\underline{S}$ and T
2: Initialize: $v_n \leftarrow k$, n = 1, . . . , N
3: for i = 1 to M do
4:  if $|Y_m| < T$ then
5:   $v_n \leftarrow v_n - S_{mn}$, n = 1, . . . , N
6:  end if
7: end for
8: Output: $\{n : v_n > 0, n = 1, \ldots, N\}$
---

In Algorithm 2, each node is initialized with k credits. When a node receives a strike, its credit is decreased by one. At the end of the algorithm, all those nodes with positive credit are declared as neighbors. It should be appreciated that Algorithm 2 can be combined with the binning approach of Algorithm 3 (described later) where desired.

For a desired SNR, a given population of nodes, and an average number of neighbors; the desired parameters can vary with respect to determining the length of the signatures, and further with what parameters to use for the sparsity of the signatures and what strike credit to use if Algorithm 3 is utilized. In one preferred embodiment, at two strikes are required for elimination. In a more preferred embodiment, at least three strikes are required for elimination. In a still more preferred embodiment, at least five strikes are required for elimination.

Figure 5:
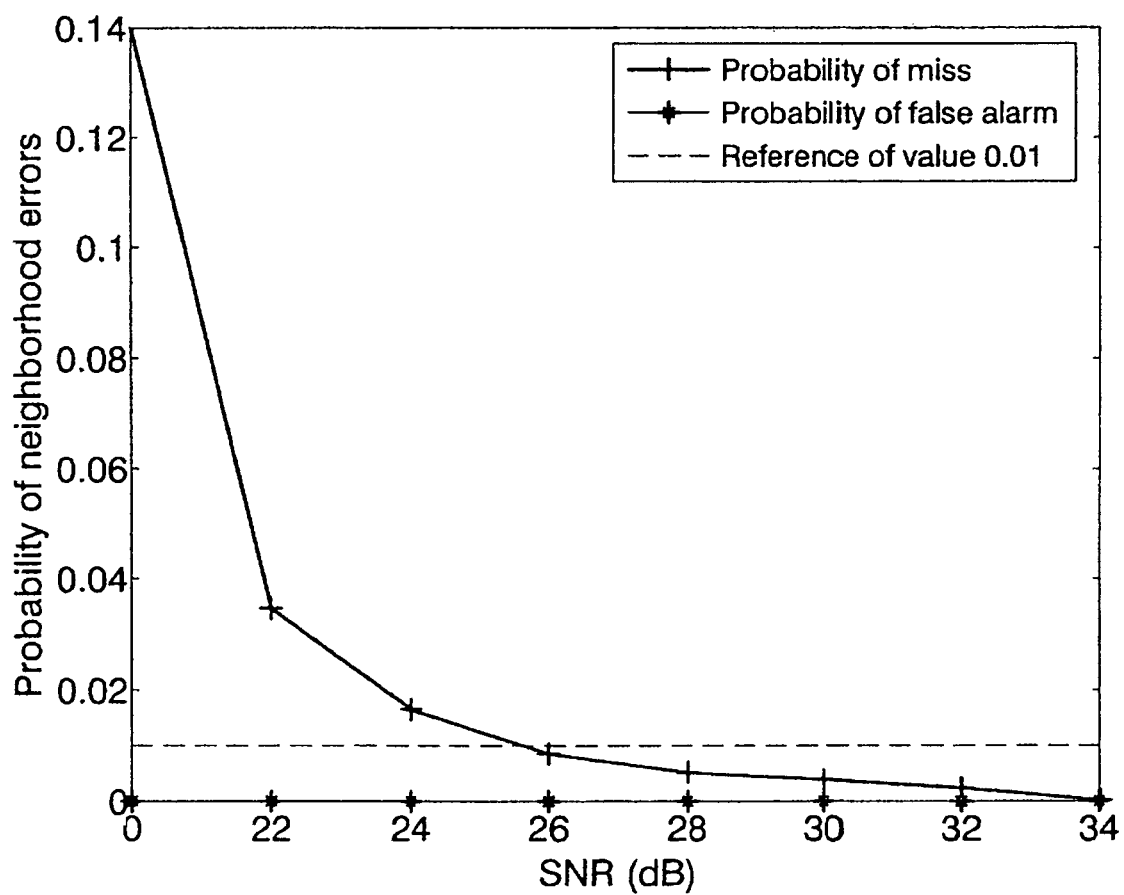
FIG. 5. is a plot of probability of neighborhood error versus SNR. No false alarm is registered, so the corresponding error probability is numerically zero. The parameters are: N=10,000, c=5, M=1,500, q=0.0247, and T=1.0.
Figure 6:
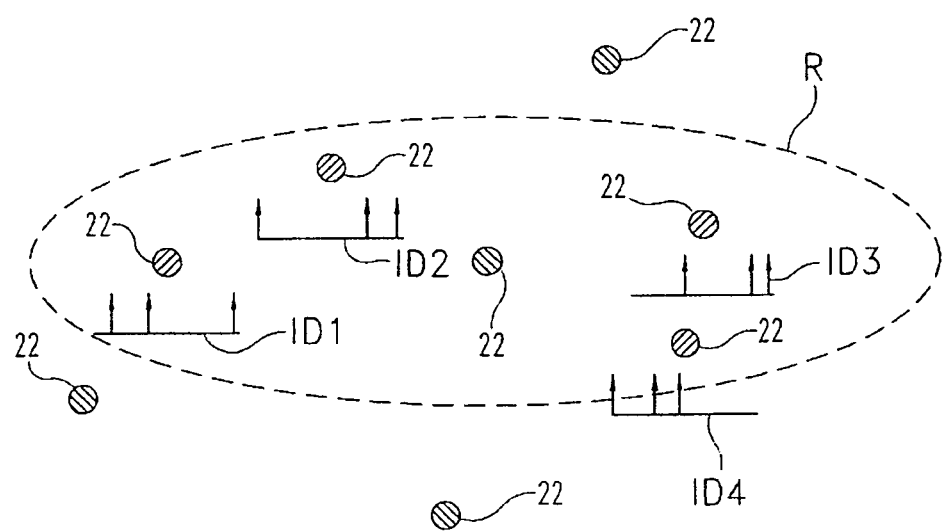
Figure 8:
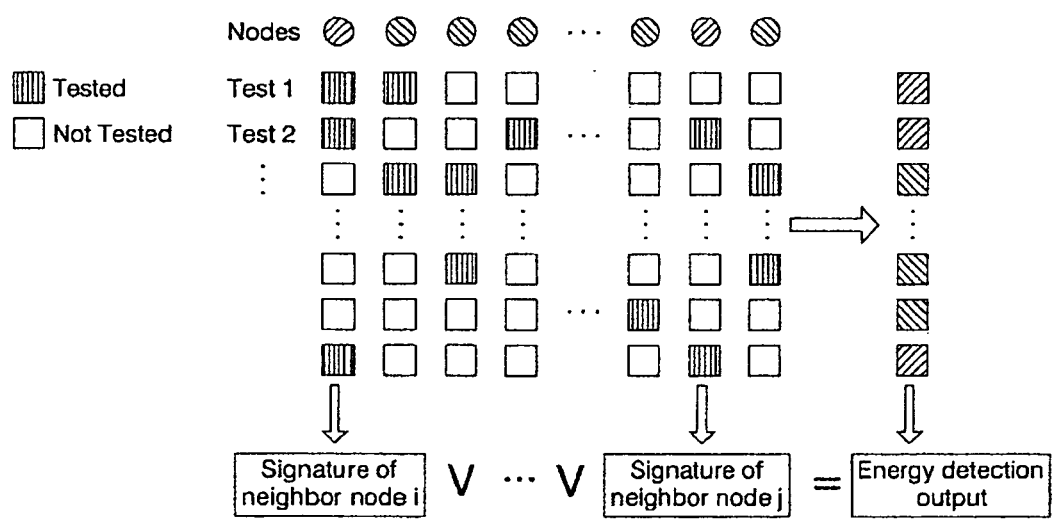
Figure 9:
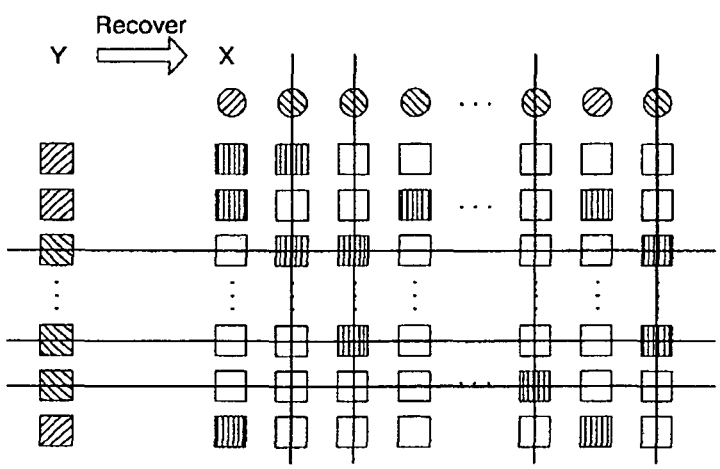
Figure 10:
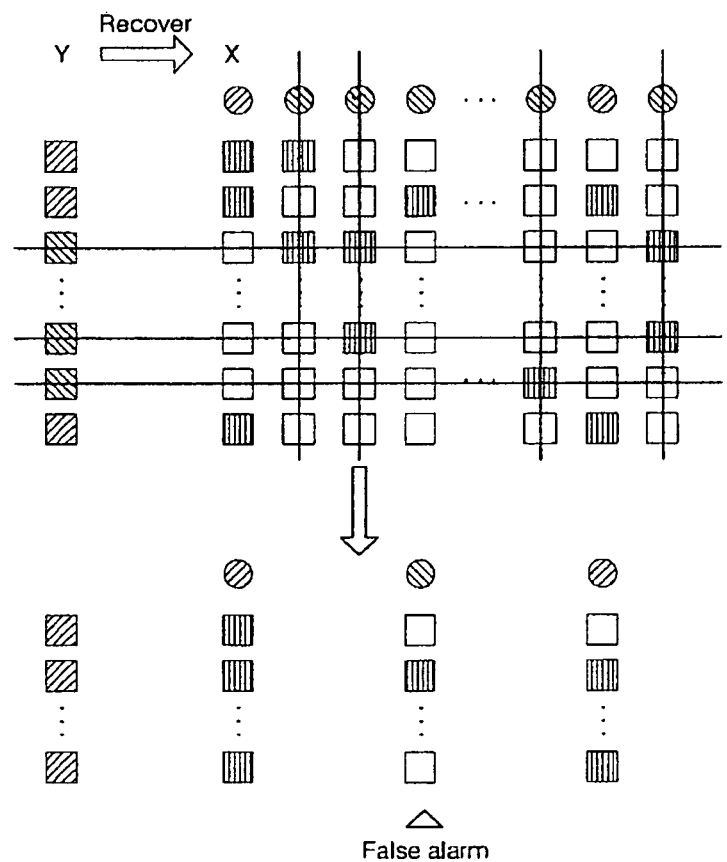

Some numerical results to illustrate the performance of RODD neighbor discovery using Algorithm 2 with Design 1 are next described. Consider an identical network which is previously simulated for Algorithm 1, with N=10,000 nodes and on average c=5 neighbors, Rayleigh fading and α=3. For a system where the number of neighborhood errors does not exceed 0.01 and the probability of false alarm is required to be below 0.004 (See FIG. 5), by solving the optimization problem described in Design 1, the following parameters are obtained: M=1,500, T=1.0 and q=0.0247. FIG. 5 plots the neighborhood error rates against the SNR. The probability of false alarm is effectively zero, whereas the probability of miss is lower than 0.01 with SNR higher than 26 dB. FIGS. 6-10 provide further diagrammatic representations of the application of Algorithm 1. FIG. 6 also depicts various identifiers (signatures) ID1, ID2, ID3, and ID4—which are each represented by a partial pulse diagram over time. For these pulse diagrams, a sequence of time slots (intervals) are represented on the horizontal axis with each pulse representing presence of transmission energy for the corresponding time slot.

For any of the embodiments and algorithms of the present application, including variations and combinations thereof, it should be appreciated that the neighbor discovery is typically performed by many if not all of the nodes in turn to fully define a network of interest. Further, it should be appreciated that as network definition proceeds, the neighbors discovered by one node may be used by a neighboring node to confirm its results and/or to reduce the computations/operations needed to determine its own neighbors.

Many further embodiments of the present application are envisioned. In one example, the techniques of the present invention are combined with aspects of standard neighbor discovery techniques to lend further inventive aspects to the technology. In a further example, the wireless communication nodes in a neighborhood simultaneously send signatures in response to a beacon signal. Each node signature is a string of pulses and pauses—similar to a telegraph. The receiver sees a summation of signatures, and views the summation itself as a string of pulses (some amount of energy) and pauses (no energy). The binary nature of this simple on-off switching schema enables non-coherent energy detection. Group testing is then used to eliminate nodes that are not part of the neighborhood. Each node in a population is itself viewed in binary fashion—it either is or is not in the neighborhood. By observing that this "node vector" is sparse (the vast majority of nodes are out of neighborhood and can be entirely discounted), compressed sensing principles may be applied and relatively few trials are needed in group testing. For example, one embodiment uses the process of elimination to discover neighboring nodes, so node signatures need to be known in advance for a population. Signatures can be designed as a pre-determined hashing function of the network interface addresses so that there is no additional overhead for distributing signatures in network deployment.

In another embodiment, each node is assigned a unique signature. Nodes simultaneously transmit their signatures during a discovery period. The query node then determines, based on the superposition of the signatures, a small number of nodes as its neighbors, out of a generally large number of nodes in the network. This may be considered a sparse recovery problem, which admits efficient algorithms. Using this scheme, a single frame time (typically a few thousand bits) suffices to achieve reliable discovery for very large networks. This is in contrast to conventional schemes, where each node repeatedly transmits its identity with random delay, so that a receiver is able to identify each neighbor at least once without collision.

In one embodiment, sparse pseudo-random on-off signatures are assigned to the nodes so that each node can listen to the channel during its own off-slots. Despite a half-duplex constraint, all nodes can simultaneously discover their respective neighborhoods, using a simple noncoherent detection algorithm based on group testing. In one experiment, a network of 10,000 nodes is simulated, where each node has 50 neighbors on average, and the channel between each pair of nodes is subject to path loss and Rayleigh fading. At moderate signal-to-noise ratios, all nodes can identify their neighbors with on average 99% accuracy using 2,500-bit signatures. This embodiment requires much fewer symbol transmissions than random-access discovery.

A node interested in its neighborhood (henceforth referred to as the query node) listens to the wireless channel during the discovery period, and then decodes the NIAs of its neighbors. Neighbors transmit signals which contain their identity information. Generally, non-neighbors either do not transmit, or their signals are weak enough to be regarded as noise. The physical channel is a multiaccess channel, where the observation made by the query node is a (linear) superposition of transmissions from its neighbors, corrupted by noise. The goal of neighbor discovery is to identify, out of all valid NIAs, which ones are used by its neighbors.

Neighbor discovery protocols, such as that of the IETF MANET working group and the ad hoc mode of IEEE 802.11 standards, generally operate as follows: The query node broadcasts a probe request. Its neighbors then reply with probe response frames containing their respective NIAs. If a response frame does not collide with any other frame, the corresponding NIA is regarded to be correctly received. Due to lack of coordination, each neighbor has to retransmit its NIA enough times with random delays, so that it is successfully received by the query node with high probability. Generally, all nodes can simultaneously discover their respective neighborhoods and transmit their NIAs during the discovery period, which may be referred to as random-access neighbor discovery.

Random access assumes a specific signaling format such as a node's response over the discovery period because it basically consists of randomly delayed repetitions of its NIA. This signaling format allows the NIA to be directly read out from a successfully received frame. Assuming any structural restriction on the responses is removed except for the duration of the discovery period, then each node can be assigned a distinct response, or signature, and the task of a query node is to identify the constituent signatures (or corresponding NIAs) based on the observed superposition. The number of neighbors is generally orders of magnitude smaller than the node population, or more precisely, the size of the NIA space, so that neighbor discovery is by nature a compressed sensing (or sparse recovery) problem. The required number of measurements (i.e., the signature length) is generally smaller than the NIA space.

The present application describes a system, referred to as RODD neighbor discovery, which attains desirable trade-off between performance and the length of the discovery period, i.e., the discovery overhead. In this system, nodes simultaneously transmit their signatures within a single frame interval and then the neighborhood is decoded.

Another embodiment describes using on-off signaling to achieve full-duplex neighbor discovery using half-duplex radios, which departs from conventional schemes where a user's transmitting slots are scheduled away from its own receiving slots.

In one embodiment, each node in a wireless network is assigned a unique network interface address. Let the address space be $\{0, 1, \ldots, N\}$ (e.g., if the space consists of all IP addresses then $N=2^{32}-1$). The actual number of nodes can be relatively smaller than N, but as far as neighbor discovery is concerned, it is assumed that there are exactly N+1 nodes. Other parts of the application will discuss having all nodes simultaneously discover their respective neighborhoods, but for now It is assumed that node 0 is the only query node and sends a probe signal to prompt a neighbor discovery period of M symbol intervals. Each node n in the neighborhood responds by sending a signal $S_n$ which identifies the node n. The signal $S_n$ is also referred to as the signature of node n. It is assumed that all responses consist of M symbols, so that each signature $S_n$ can be expressed as $S_n = [S_{1n}, \ldots, S_{Mn}]^T$. If a node only transmits over selected time instances, those symbols corresponding to non-transmissions are regarded as zero. Variation of the small propagation delays are currently ignored between the query node and its neighbors, and symbol-synchronous transmissions from all nodes is assumed. The received signal of node 0 can thus be expressed as $$Y = \sqrt{\gamma} \sum_{n \in N_0} U_n S_n + W \tag{1}$$

where $\gamma$ denotes the average channel gain in the SNR, $N_0$ denotes the set of NIAs in the neighborhood of node 0, $U_n$ denotes the complex-valued coefficient of the wireless link between node 0 and neighbor n, and W consists of M independent unit circularly symmetric complex Gaussian random variables, with each entry $W_m \sim CN(0,1)$. Transmissions from non-neighbors, if any, are accounted for as part of the additive Gaussian noise.

It is assumed that the signature of each node is predetermined. Further assume that all signatures are known to node 0. The goal is thus to recover the set $N_0$, given the observation Y, the SNR $\gamma$, and knowledge of the signatures $S_1, \ldots, S_N$. The random coefficients $U_n$ are unknown except for its statistics. Binary variables $B_n$ are set to 1 if node n is a neighbor of node 0, and set to 0 otherwise. Let $X=[B_1U_1, \ldots, B_NU_N]^T$ and $\underline{S}=[S_1, \ldots, S_N]$. Then model (1) can be rewritten as $$Y=\sqrt{\gamma}\underline{S}X+W \qquad (2)$$

to determine which entries of X are nonzero, i.e., to recover the support of X. The model (2) represents a noisy linear measurement system. This application refers to $Y=[Y_1, \ldots, Y_M]^T$ as the measurements, and $\underline{S}_{M\times N}$ as the measurement matrix. It is assumed that $B_1, \ldots, B_N$ are independent and identically distributed (i.i.d.) Bernoulli random variables with $P\{B_1=1\}=c/N$, where c denotes the average number of neighbors of node 0. It is further assumed that $U_1, \ldots, U_N$ are i.i.d. with known distribution, and are independent of $B_1, \ldots, B_N$ and noise. To recover the support of X is then a well-defined, familiar statistical inference problem.

It is assumed that the signatures $S_n$ are known input to the neighbor discovery algorithm carried out by the query node, although in some cases they are not completely known before its transmission. In one non-limiting example, in random-access neighbor discovery, each $S_n$ consists of repetitions of the NIA of node n interleaved with random delays. Sufficient synchronization flags, training symbols and parity check bits are embedded in each packet so that the delays can be measured accurately and NIA be recovered, which increases the overhead.

The signatures $S_n$ need not consist of repetitions of the NIA. Generally, the signatures have as small cross-correlations as possible. With large M, it is relatively closer to optimal to design the signatures as a collection of (pseudo-) random sequences. For M, the number of symbols epochs in one discovery period, is generally smaller than the node population N+1, so that the linear system (2) is under-determined even in absence of noise. It is generally more challenging to "invert" the linear system to recover the neighborhood. This application describes that discovery using cleverly designed signatures is not only feasible, but can be more efficient than random-access schemes. This result arises because the vector variable X is very sparse, so that neighbor discovery is fundamentally a compressed sensing problem, which implies that relatively few measurements, which can be orders of magnitude smaller than the node population N, are sufficient for reconstructing the N-vector X or its support.

It is feasible to have nodes transmit their signatures simultaneously and synchronously. Some common clocks, such as access to the global positioning system (GPS) can provide the timing needed. Further, it is possible to have all communicating peers be approximately symbol-synchronized, so that the timing difference (including the propagation delay) is much smaller than the symbol interval. This result can be achieved by using distributed algorithms for reaching average consensus. Generally, all neighbors are physically close to the query node, so that the radio propagation delay is relatively smaller compared to a symbol epoch. In one non-limiting example, if neighbors are within 300 meters, the propagation delay is 1 microsecond, which is relatively smaller than the bit or pulse interval of a typical MANET. Generally, more pronounced propagation delays can also be explicitly addressed in the physical model. There is generally no fundamental disadvantage by using compressed neighbor discovery, because any alternate scheme has to deal with the same timing uncertainty.

In one system, it is assumed that the channel gains $U_n$ to be Rayleigh fading random variables. In the following description, the effect of network topology and propagation loss is incorporated in the channel model. Here, the statistics of the channel coefficients $U_n$ are described with those considerations. It is assumed all nodes transmit at the same power. Moreover, large-scale attenuation follows power law with path-loss parameter a, and small-scale attenuation can be modeled as independent fading. Reciprocity is also assumed so that the gains of the two directional links between any pair of nodes are identical.

In this description, for simplicity, let N nodes be ("uniformly") distributed on a large area of size A according to a homogeneous Poisson point process. The boundary effect is ignored. A uniformly and randomly selected pair of nodes is assumed. The channel power gain between them is $Gr^{-\alpha}$, where G denotes the small-scale attenuation and r stands for the distance between them. The nodes are called a neighbor of each other if the channel gain between them exceeds a certain threshold, i.e., $Gr^{-\alpha} > \eta$ for some fixed threshold h. For every $u \geq \sqrt{\eta}$, $$P(Gr^{-\alpha} > u^2 \mid Gr^{-\alpha} > \eta) = \frac{E\{P(Gr^{-\alpha} > u^2 \mid G)\}}{E\{P(Gr^{-\alpha} > \eta \mid G)\}} = \frac{u^{-\frac{4}{\alpha}}}{\eta^{-\frac{2}{\alpha}}}$$

It is assumed that the coefficients $\{U_n\} n\in N_0$ of all neighbors of node 0 are i.i.d. complex-valued circularly symmetric random variables. For simplicity, it is further assumed that the distribution of the amplitude $|U_n|$ is identical to the distribution of $\sqrt{Gr^{-\alpha}}$ conditioned on that it exceeds $\sqrt{\eta}$. That is, the probability density function (pdf) of $|U_n|$ is $$p(u) = \begin{cases} \frac{4}{\alpha} \frac{u^{-4/\alpha-1}}{\eta^{-2/\alpha}}, & u \geq \sqrt{\eta}; \\ 0, & \text{otherwise.} \end{cases} \qquad (3)$$

The distribution does not depend on the fading statistics. The average number of neighbors is related to the threshold h by $c=NP(Gr^{-\alpha} \geq \eta)$.

This application also addresses the circumstance that many or all nodes in the network need to discover their respective neighborhoods at the same time. The challenge posed by the half-duplex constraint is that a wireless node cannot receive any useful signal at the same time and over the same frequency band on which it is transmitting. This is due to the limited dynamic range of affordable radio frequency circuits. Standard designs of wireless networks use time- or frequency-division duplex to schedule transmissions of a user away from the time-frequency slots the user employs for reception.

A random-access scheme supports network-wide discovery because each node transmits its NIA intermittently, so that it can listen to the channel to collect neighbors' NIAs during its own epochs of non-transmission. Collision is inevitable, but if each node repeats its NIA a sufficient number of times with enough (random) spacing, then with high probability it can be received by every neighbor once without collision. The compressed neighbor discovery scheme described in this application is also suitable for network-wide discovery if on-off signatures are used.

In one embodiment, using random on-off signatures is described. Specifically, the measurement matrix S consists of i.i.d. Bernoulli random variables, with $P(S_{mn}=1)=1-P(S_{mn}=0)=q$ for all m, n. In practice, the signature of each node can be generated using a common pseudo-random number generator with its own NIA as the seed, so that it suffices to distribute the generator (e.g., as a built-in software/hardware function). In principle, each node can construct S by enumerating all valid NIAs, so that all signatures are known to all nodes in advance without any communication overhead. It is also possible to design a reversible mapping so that it is easy to recover the index n from the signature $S_n$.

In the absence of noise, neighbor discovery with on-off signatures is equivalent to the classical problem of group testing. Basically each measurement $$Y_m^- = \sqrt{\gamma} \sum_{n=1}^{N} S_{mn}^- X_n + W_m$$

is nonzero if any node from the group $\{n : n=1, \ldots, N,$ and $S_{mn} \neq 0\}$ is a neighbor. Algorithm 1 visits every measurement with $Y_m$, its power below a threshold T to eliminate all nodes that would have transmitted energy at time m from the neighbor list. Those nodes which survive the elimination process are regarded as neighbors.

There exists an issue of inferring about the inputs to a noisy linear system from the outputs. The group testing algorithm may be used to solve an RFID problem. Multiuser detection may be applicable to model (2). Furthermore, a related user activity detection problem in cellular networks, suggests the use of coherent multiuser detection techniques. Such techniques do not necessarily apply here because they require knowledge of the channel coefficients $U_n$ of all neighbors, which is unavailable before the neighbors are even known. Channel estimation may be applicable but generally the algorithm does not scale well with the network size.

Generally, for the embodiments of Algorithms 1 and 3, two types of errors are typical: If a neighbor is eliminated by the algorithm, it is called a miss. On the other hand, if a non-neighbor survives the algorithm and is thus improperly declared a neighbor, it is called a false alarm. Both a miss and false alarm are considered neighborhood error, and:

Let $\epsilon_m$, $\epsilon_f$ and $\epsilon$ denote the average number of misses, false alarms and neighborhood errors respectively, that is, averaged over all realizations of S, U, B and W.

Algorithm 1 requires only noncoherent energy detection. One weakness is that discovery is generally reliable when the SNR is high and the average number of neighbors a node has is relatively small, whereas the error performance is unacceptable for many practical scenarios.

In another embodiment, instead of eliminating a node as soon as it disagrees with one measurement, multiple measurements are consulted before a decision is made. In addition, to decouple the measurements, the phase of the samples is randomized for each signature.

The events which trigger elimination are examined. For each node eliminated, the number of near-zero measurements are recorded, which point to its elimination, and are referred to as strikes. Generally, most of the time a neighbor receives no strike, but occasionally a neighbor may receive 1, 2 or 3 strikes. In contrast, generally, most non-neighbors receive dozens of strikes, whereas a small number of non-neighbors receive fewer than 5 strikes. In other words, generally a neighbor who is eliminated receives mostly one strike, and occasionally two strikes or more, whereas most non-neighbors receive many more strikes. The reason is that at moderate to high SNR, two neighbors both receive a strike if their pulses cancel at the same measurement, because they each transmit a pulse with approximately opposite channel coefficient. This result is infrequent because signatures are quite sparse. On the other hand, a non-neighbor gets struck many times because it would have transmitted over many intervals with zero measurement. Algorithm 2, which is referred to as k-strike group testing, requires that a node be eliminated only if it receives at least k strikes.

Using multiple strikes is similar to belief propagation, where the decision for each node at question is made using beliefs provided by all relevant measurements. One could also carry out belief propagation fully and iteratively. Besides tuning the number of strikes, it is instructive to further examine one of the causes of misses, which is that the pulses of two or more neighbors cancel at the receiver, so that the measurement $Y_m$ is below the threshold at multiple intervals. This takes place for two neighbors $n_1$ and $n_2$ if their channel coefficients are similar in amplitude but opposite in phase, so that $S_{mn_1} U_{n_1} + S_{mn_2} U_{n_2} \approx 0$ for every interval m where both nodes transmit a pulse, which implies the neighbors will be eliminated erroneously with a number of strikes wherever their pulses coincide.

It is possible to reduce misses with essentially no impact on false alarm. The idea is to let each node randomize the phases of its signature at different slots independently, i.e., use $S_{mn} e^{j\Theta_{mn}}$ in lieu of $S_{mn}$ where $\Theta_{mn}$ are i.i.d. uniform on $[0, 2\pi)$. In this case, if $$S_{mn_1} e^{j\Theta_{mn_1}} U_{n_1} + S_{mn_2} e^{j\Theta_{mn_2}} U_{n_2} \approx 0$$

for some slot m, it is unlikely that this is still true for other slots. The randomization is relatively easy to implement at transmitters and requires no change at the receivers, because knowledge of the phases are not needed by the noncoherent detection algorithm.

Generally, it is difficult to estimate the error rate of the group testing algorithms. There have been asymptotic results where it is shown that the error probabilities vanish as the problem size increases as long as the number of measurements exceeds a certain level, which depends typically logarithmically on the node population. As discussed later, the following upper bound for the rate of false alarm achieved by Algorithm 3 with k=2 strikes is developed.

Proposition 1: Consider a network of N+1 nodes where the query node has on average c neighbors modeled by (2). The false alarm rate $P_f$ achieved by Algorithm 3 with k=2 strikes satisfies the following as a function of (M, q, T):

$$P_f \leq P_f^u(M, q, T) \qquad (4)$$

where, with $\Phi(T) = 1 - e^{-T}$, $$P_f^u(M, q, T) = \qquad (5)$$
$$\left(1 + Mq\left(\frac{2T}{\alpha\eta\gamma} + \Phi(T)\right)e^{q\Phi(T)}\right) \times N\exp[-Mq\Phi(T) + c(e^{Mq^2\Phi(T)} - 1)].$$

Given (N, γ, α, η), (M, q, T) is chosen such that $Mq^2\Phi(T) \ll 1 \ll \log N \ll Mq\Phi(T)$ and $T/(\alpha\eta\gamma)$ is relatively small, so that the upper bound is essentially of the order of exp [log N−MqΦ(T)]≈0.

Although it is hard to obtain a useful upper bound for the rate of miss, a good indicator is $M_q$, i.e., the average number of pulses in the signature. For a given neighbor, the larger $M_q$ is, the more likely its transmission during an interval gets canceled by other nodes, thus causing unwanted strikes.

There is a trade-off between false alarms (large $M_g$ is better) and misses (small $M_q$ is better).

Next, a description of how to find the optimal design trade-off between cost and error performance is described. The cost here refers to the number of measurements (i.e., the neighbor discovery overhead) and the SNR. It is assumed that the node population and density, as well as the fading characteristics are given, which are not controlled by the designer.

Assume first the signature length M, and hence the amount of overhead is fixed. One sensible design is then to minimize q under the constraint of the rate of false alarm (since q is a good indicator of the rate of miss with fixed M). Assume also that Algorithm 2 with two strikes is used. The optimization problem becomes:

$$\text{minimize} \quad q \qquad (6)$$
$$\text{subject to} \quad P_f^{\mu}(M, q, T) \leq p_0$$
$$T \geq 0$$

where $P_f^{\mu}(\cdot)$ is given by (4). In other words, the optimal pair (q, T) is solved as the optimal objective and optimizer of (6) respectively.

Next some numerical results obtained are shown based on the following design: The optimal sparsity and threshold, (q, T), can be obtained at each SNR according to (6). It turns out that the optimal values of q do not differ much for a wide range of SNR. As using identical signatures under all channel conditions is preferable in practice, the sparsity q is fixed as the optimal solution to (6) at SNR=20 dB. For each SNR, the threshold T used by the receiver numerically is fine tuned, such that the error rate is minimized. As a non-limiting example, consider first a network with N=10,000 nodes besides node 0, on average c=50 nodes in each neighborhood, Rayleigh fading and a=3. Furthermore, M=2,500 symbols for each signature and allows k=2 strikes to eliminate a node in Algorithm 5. The sparsity is fixed to q=0.013, so that there are on average $M_q$=32.5 pulses in a signature. The rate of miss and the rate of false alarm are plotted against the SNR as the solid curve and the dotted curve, respectively, with '+' markers in FIG. 12. Here missed neighbors are the dominant source of error although its rate drops below 2% at 26 dB. One simple improvement is to use more strikes so that real neighbors are less likely to be eliminated. It is possible but increasingly cumbersome to derive the error rate achieved by Algorithm 2 for k>2 strikes. Fortunately, the designs optimized for k=2 are also good candidates for k=3. Also plotted are the curves (marked with 'Δ') obtained at identical situations except that a 3-strike algorithm is used for decoding. Using 3-strike algorithm improves the rate of miss by more than 7 dB compared to using the 2-strike algorithm. Although the rate of false alarm increases, the total error rate is less than 1% at 23 dB or higher.

Figure 12:
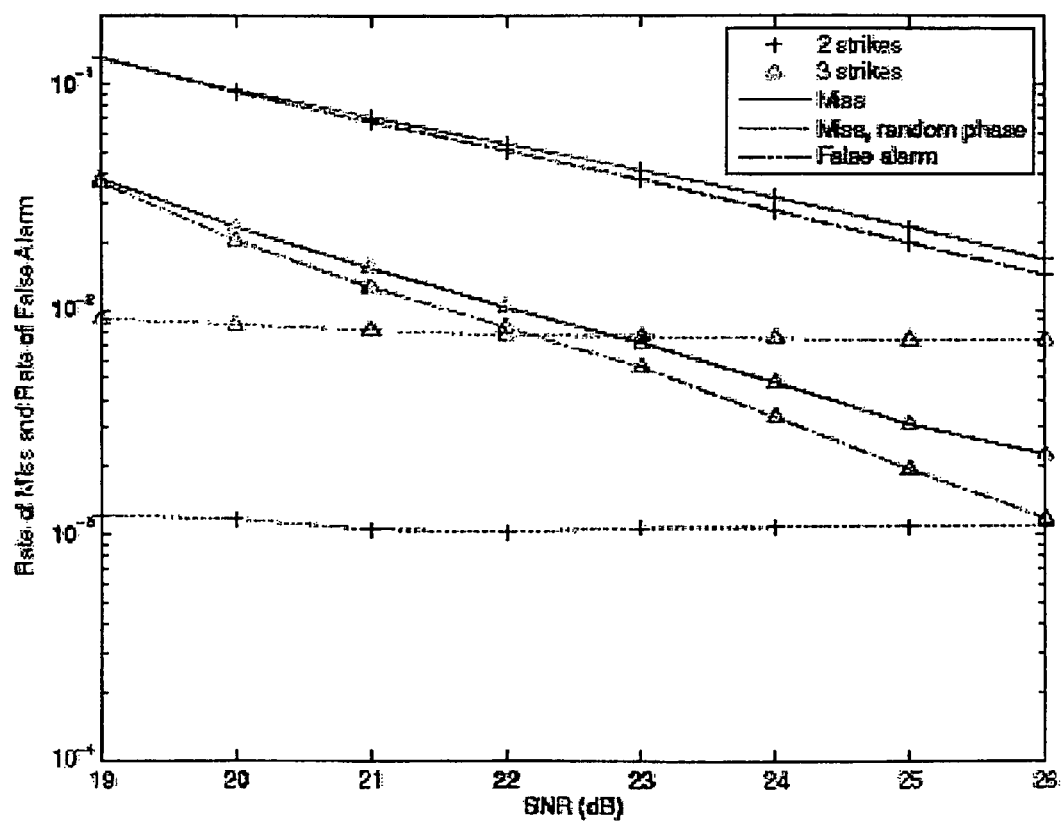
FIG. 12 is a plot of rates of miss and false alarm versus SNR. In all 1,000 trials, N=10,000, c=50, M=2,500, and q=0.013.
Figure 13:
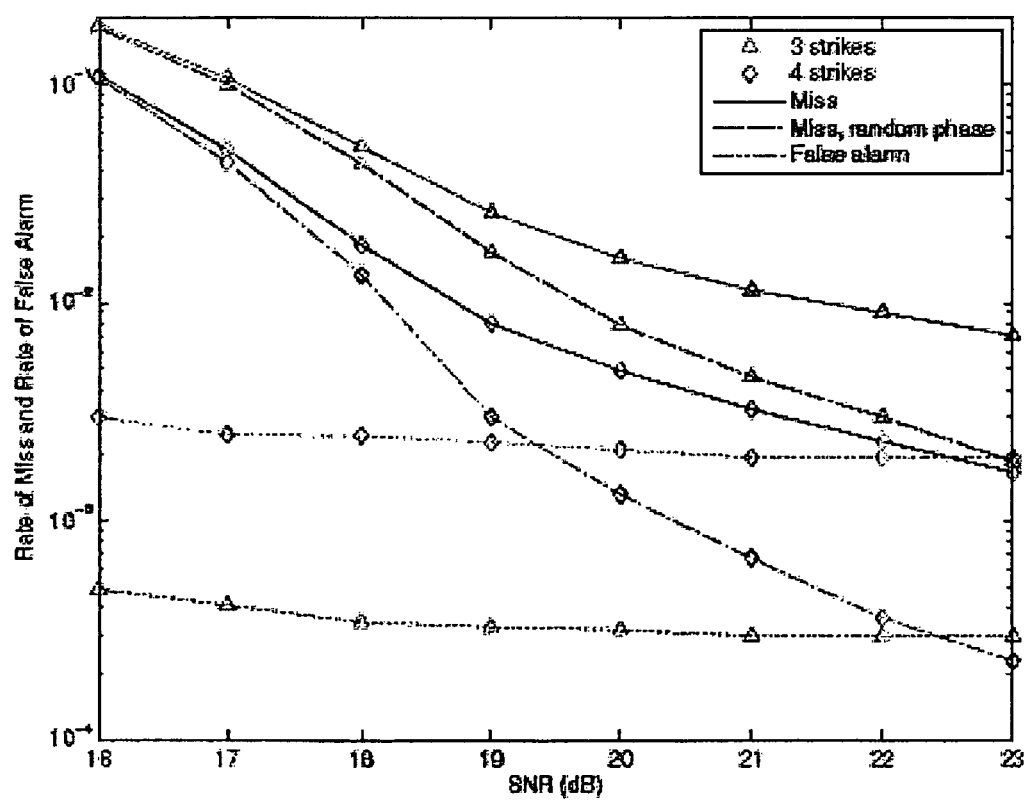
FIG. 13 is a plot of rates of miss and false alarm versus SNR. In all 1,000 trials, N=10,000, c=10 and M=1000.

Under the same situations and using identical design parameters, the rate of miss achieved with phase randomization is also plotted in FIG. 12, using dash-dot curves. The rates for both 2-strike and 3-strike cases are relatively improved. FIG. 13 repeats the preceding experiment, except for a sparser network, where the average number of neighbors a node has is c=10, out of N=10,000 nodes, and that shorter signatures are used: M=1,000. The sparsity is fixed to q=0.035, so that on average 35 pulses are found in a signature. In this case using 3-strike and 4-strike algorithms are better than using the 2-strike algorithm. Curves for 3-strike and 4-strike systems are marked by 'Δ' and '◊' respectively. The improvement from using phase randomization is relatively more pronounced with more strikes. With 4 strikes, the rate of miss can be reduced by almost 10 fold at SNR=23 dB. At 19 dB, the total error rate can be as low as 0.6%, achieved by using the 4-strike algorithm. If the 3-strike algorithm is used, the error rate is as low as 0.2% at SNR=23 dB.

The algorithms and analysis can be extended to network-wide neighbor discovery, where all or any subset of nodes acquire their neighborhood simultaneously. This is an advantage of using on-off signatures, because a node can receive useful signal during its own off-slots despite the half-duplex constraint. The signatures are often relatively sparse (e.g., q<0.04 in the preceding numerical examples), so that "erased" received symbols due to one's own transmission are few. This approach also implies that even if the energy of a pulse leaks into neighboring symbol intervals, there are still enough off-slots for making observations.

The impact of the half-duplex constraint is in effect a reduction of the length of the signatures. From the viewpoint of any query node, once the erasures are purged, models (1) and (2) still apply, if the number of measurements M is replaced by a random variable of binomial distribution with parameters (M, 1−q). For large M, the number of useful measurements is approximately M(1−q). The discovery algorithm can be carried out by all nodes simultaneously. If M is increased by a factor of 1/(1—q), then the performance of network-wide neighbor discovery is roughly the same as in the case of a single query node with the original signature length.

Algorithms 1 and 2 basically visit each entry of the measurement matrix once, so that their computational complexity is O(MN). A general purpose processor may handle up to N=$10^5$ NIAs in real time (where M is typically a few thousand). Hardware implementation using, for example, programmable gate arrays, can take advantage of the fact that the elimination procedure (which is similar to group testing) can be carried out in parallel. In this case, it is possible to carry out compressed neighbor discovery for a relatively large address space including all 32-bit IP addresses.

For large networks, such as those where the number of nodes exceeds one million, its computation complexity may become challenging for some implementations. To address these implementations, binning may be used to decompose neighbor discovery among a large number of nodes into several smaller problems each of which involves much fewer candidates. For this alternative embodiment, let parameter $\beta \in (0, 1)$ which is the binning exponent. For convenience, let Nβ be an integer. The binning method contains $[1/\beta]+1$ stages. On stage $i \in \{1, \ldots, 1/\beta+1\}$, using some mechanism, for example Hashing, all nodes can be randomly distributed into Nβ bins with $N^{1-\beta}$ nodes in each bin. Each bin is then assigned an $M_i \times 1$ binary vector as its signature and every node in the same bin uses the bin signature as its own signature for stage i. Distributing nodes into bins as well as generating sets of bin signatures is independent across different stages. After stacking signatures for different stages together, the resulting signature for each node is a $$\left( \sum_{i=1}^{[1/\beta]+1} L_i \right) \times 1 \text{ vector.}$$

Next, one nonlimiting example of signature design with binning is described. Let N=$10^6$ and β=1/2, there are 3 stages and $N^{1/2}$=1000 bins with 1000 nodes in each bin on every stage. Taking node 1 as an example, suppose it is distributed into bin $b_1$, bin $b_2$ and bin $b_3$ on the consecutive three stages, and also suppose generation of three different sets of signatures (denoted by $S^1$, $S^2$ and $S^3$, respectively), then the signature for node 1 is constructed by stacking three vectors and is represented by:

$$[S_{b_1}^{1T}, S_{b_2}^{2T}, S_{b_3}^{3T}]^T.$$

During the neighbor discovery process, the neighboring nodes respond with their respective signatures after receiving a beacon signal from node 0. By applying the direct algorithm to the received signal associated with each stage, node 0 can find out which bins contain neighbors as well as which nodes are located in these neighbor-containing bins on each stage. According to the performance of the direct algorithm (Algorithm 1), when $N\beta$ is big enough, node 0 can detect the neighbor-containing bins with high accuracy. Note that for those real neighbors, they must be detected on every stage, while for those non-neighboring nodes, the probability that they appear in one of the detected bins on every stage can be extremely small. A nonlimiting example of how group testing with binning can be characterized is Algorithm 3 as follows:

---
Algorithm 3: Group Testing with Binning
---
1: Input: Y, $\underline{S}^1, \ldots, \underline{S}^{[1/\beta]+1}$
2: for t = 1 to $[1/\beta]$ + 1 do
3:  $P_t \leftarrow$ {the set of bin indices detected using the direct algorithm based on the part of Y corresponding to the t-th stage }
4:  $U_t \leftarrow \{1 \leq j \leq N : \exists l \in P_t,$ such that node j is located in bin l}
5: end for
6: $I \leftarrow \cap_{t=1}^{[1/\beta]+1} U_t$
7: mark the nodes in $I$ as neighbors

---

Figure 11:
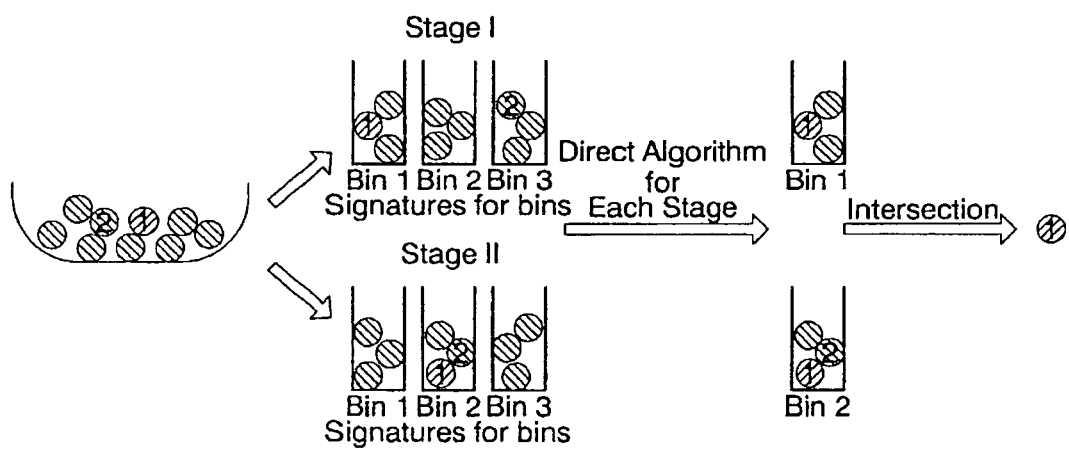
FIG. 11 is a diagrammatic view demonstrating the application of a further algorithm that may be executed by the wireless communication devices of the system of FIG. 1.

FIG. 11 provides a diagrammatic representation of the application of Algorithm 3.

An alternative, a relatively more scalable approach is to divide the address into smaller segments (e.g., a 32-bit address consists of three overlapping 16-bit subaddresses), and discover the subaddresses of all neighbors separately using the preceding algorithms. The subaddresses can then be pieced together to form full addresses by matching their overlaps.

In another embodiment, deterministic signatures based on second-order Reed-Muller codes are used as opposed to the random signatures discussed above. One advantage of such signatures is that the corresponding chirp decoding algorithm has sub-linear complexity, which allows practical, efficient discovery even if the NIA space is $2^{65}$ or larger.

The construction of the signatures can be briefly described as follows. Given a positive integer m, construct the Kerdock set $\kappa(m)$ consisting of $2^m$ binary symmetric m×m matrices. Generally, the matrices may be considered binary Hankel matrices where the top row consists of arbitrary entries and each of the remaining reverse diagonals is computed from a fixed linear combination of the entries in the top row. It is known that $\kappa(m)$ is a m-dimensional vector space with basis $\{P(e_m^i)\}_{i=1}^m$, where $P(e_m^i)$ corresponds to the m×m matrix in which all but the i-th entry in the top row are 0 and the i-th entry is set to 1. For any $l \leq m$, matrix $P \in \kappa(l)$ can be padded to an m×m symmetric matrix represented by $\mathcal{P}(P)$, where the lower left l×l submatrix is P and other entries are all zeros if any. Putting together all padded bases $\{\mathcal{P}(P(e_m^i))\}_{i=1}^m$, $\{\mathcal{P}(P(e_{m+1}^i))\}, \ldots, \{\mathcal{P}(P(e_1^1))\}$ forms a new set B, which can be regarded as basis of the m(m+1)/2-dimensional vector space formed by all m×m symmetric matrices. Given $n \leq m(m+1)/2$, any $c = (c_1, \ldots, c_n)^T \in \mathbb{Z}_2^n$ corresponds to an m×m symmetric matrix represented by $P(c) = \sum_{i=1}^n c_i \mathcal{P}(B(i)) \mod 2$, where B(i) is the i-th element in the set B.

Each node can then map its NIA into a signature as follows. Let the NIA consists of n+m bits, which is divided into two binary vectors: $b \in \mathbb{Z}_2^m$ and $c \in \mathbb{Z}_2^n$, with $n \leq m(m+1)/2$. The corresponding signature is of $2^m$ symbols, whose entry indexed by each $a \in \mathbb{Z}_2^m$ is given by $$\phi P(c), b(a) = \exp\left[j\pi\left(\frac{1}{2}a^T P(c)a + b^T a\right)\right]. \quad (7)$$

The system can thus accommodate up to $2^{m(m+3)/2}$ nodes with distinct signatures, each of length $2^m$. For example, if m=10, then there will be up to $2^{65}$ signatures of length $2^{10}=1,024$. The chirp reconstruction algorithm can be applied for a query node to recover its neighborhood based on the observations. The general idea of the iterative algorithm is as follows: 1) initialize the residual signal to Y, 2) take the Hadamard transform of the auto-correlation function of Y to expose the coefficient of the digital chirps, 3) extract the Kerdock matrix $P(c_j)$ corresponding to the largest energy component in the residual signal and determine the corresponding $X_j$, and 4) update the residual signal and repeat steps 2 to 4 until the residual falls below a threshold. The query node has thus acquired the signatures of all peers with high probability. The signatures can also be used to recover the NIAs if needed.

Figure 14:
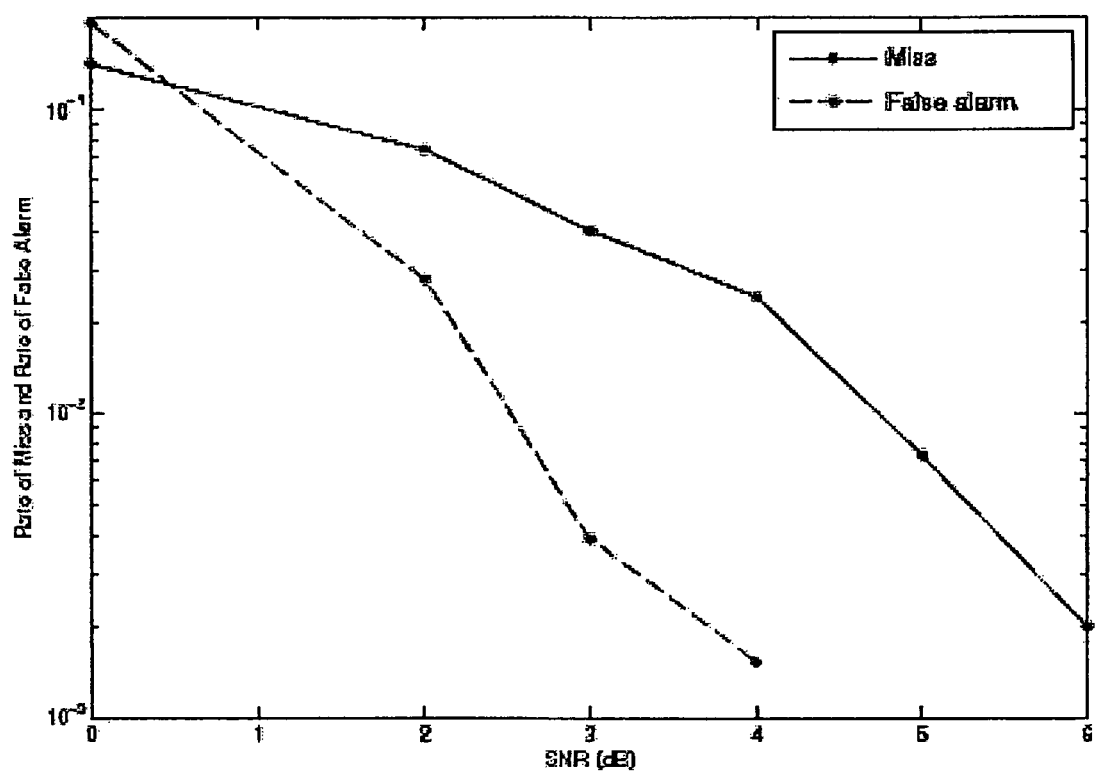
FIG. 14 is a plot of rates of miss and false alarm versus SNR. In all 60 trials, N=$2^{20}$, c=50, and M=1,024.

As an example, let m=10 and n=10 so that there are $2^{20}$ valid NIAs. Let the query node (node 0) be located at the origin and all other nodes be distributed as a Poisson point process on a square centered at the origin. Let the path loss be a=3 and the neighbor cut-off power be h=0.05. Let the density of the nodes be such that node 0 has on average c=50 neighbors. The signature length is $2^m=1,024$. The error rates are plotted in FIG. 14 against the SNR. The total error rate can be as low as 0.2% at SNR=6 dB. Note that from FIG. 12, to achieve such error rate requires 2,500-bit on-off signatures and 26 dB at least, even if the size of the address space is only 10,000.

Using Reed-Muller code enables efficient discovery in networks which are many orders of magnitude larger than that allowed by using random on-off signatures. One drawback of using the Reed-Muller code, however, is that the signatures are not sparse, so that a node cannot simultaneously receive useful signal while transmitting its own signature.

The performance of the RODD discovery schemes discussed above are compared with that of traditional random-access discovery schemes. Only one frame time is needed by RODD neighbor discovery, as opposed to many frames in the case of random access, which offers significant additional reduction of synchronization and error-control overhead embedded in every frame.

Suppose a random-access discovery scheme is used, such as the "birthday" algorithm. Nodes contend to announce their NIAs over a sequence of t contention periods. In each period, each neighbor independently chooses to either transmit (with probability $\theta$) or listen (with probability $1-\theta$). Let p=c/N. The error rate is equal to the probability of one given neighbor being missed, which is given by $$\sum_{z=1}^{N} \binom{N}{z} \rho^z (1-\rho)^{N-z} [1 - \theta(1-\theta)^{z-1}]^t. \quad (8)$$

Consider a network with 10,000 nodes and on average 10 nodes around node 0. It is assumed that time is slotted and transmission of each bit takes one slot. Suppose 1,000-bit signatures are used and the SNR is 23 dB. The error rate achieved by Algorithm 2 with k=3 is no greater than 0.002 (see FIG. 13). If random-access discovery is carried out, the smallest number of contention periods that brings the error rate below 0.002 is 194, which is obtained when $\theta$ is set to 0.072. In each contention period, the number of bits transmitted is at least $\log_2(10^4) \approx 14$ just to carry the NIA. With binary signaling, the total overhead is at least 194×14=2716 slots, which is 2.7 times that needed by compressed neighbor discovery with on-off signaling.

The efficiency of compressed neighbor discovery can be an order of magnitude higher than that of random access if all overhead is accounted for because transmitting a 14-bit NIA reliably over a fading channel generally requires a few hundred bits with all overhead included.

RODD neighbor discovery is now compared with the popular IEEE 802.11g technology. Consider the ad hoc mode of 802.11g with active scan, which is basically a random-access discovery scheme. The signaling rate is 4 μs per orthogonal frequency division multiplexing (OFDM) symbol. One probe response frame takes about 850 μs. (The response frame includes additional bits but is dominated by the NIA.) Thus it takes at least 850 μs×194≈165 ms for a query node to discover 10 neighbors with error rate 0.002 or lower. If RODD neighbor discovery with on-off signature is used, 1,000 symbol transmissions suffice to achieve the same error rate. Using 802.11g symbol interval (4 μs), reliable discovery takes merely 4 ms. A relatively conservative choice of the symbol interval is 30 μs, which includes carrier (on-off) ramp period (say 10 μs) and the propagation time (less than 1 microsecond for 802.11 range). RODD neighbor discovery then takes a total of 30 ms, less than ⅕ of that required by 802.11g.

The present application has discussed several embodiments including neighbor discovery schemes, which are efficient, scalable, and relatively easy to implement. The schemes fully exploit the superposition nature of the wireless medium. Moreover, using on-off signatures allows half-duplex nodes to achieve network-wide full-duplex discovery. The transmission of pulses by each node (which identifies the node) is scheduled at the symbol level, rather than at the timescale of the frame level.

The proposed schemes are well suited and outperform existing schemes for mobile networks where the topology of the network changes over time. This is because one single frame transmission suffices for the proposed schemes. Within a single frame interval (<100 ms) nodes move by a small amount. It is also possible to create a Markov model for connectivity and incorporate the model into the neighborhood inference problem. The schemes discussed herein can also be extended to multicarrier systems.

Below is an analysis of the rate of false alarm achieved by Algorithm 2 with k=2 strikes. First, let the binary random variable $E_f^n$ be equal to 1 if node n is a false alarm and equal to 0 otherwise. Let $\nu_0$ and $\nu_1$ denote the set of nodes that take zero and one strike, respectively. Then $\nu = \nu_0 \cup \nu_1$ surviving nodes after elimination. In addition, $\{\Omega_1^z\}_{z=1}^{N-1}$ is used to denote the event that node 1 is not a neighbor and there are in total z neighbors. The false alarm rate is upper bounded as follows:

$$P_f = \frac{N}{c} P(E_f^1 = 1) \leq \frac{N}{c} \sum_{z=0}^{N-1} G(z) P(1 \in V | \Omega_1^z) \quad (9)$$

where $$G(z) = \binom{N-1}{z} \rho^z (1-\rho)^{N-1-z} \text{ and } \rho = c/N.$$

Note, $$P(1 \in V | \Omega_1^z) = P(1 \in V_0 | \Omega_1^z) + P(1 \in V_1 | \Omega_1^z). \quad (10)$$

To calculate $P(1 \in \nu_0 | \Omega_1^z)$, define a sequence of events $\Lambda_1^m \triangleq \{\text{node } 1 \text{ survives the first m tests}\}$ for m=1,2,.... Using the chain rule of join probability, $$P(1 \in V_0 | \Omega_1^z) = P(\Lambda_1^1 | \Omega_1^z) \prod_{m=2}^{M} P(\Lambda_1^m | \Lambda_1^{m-1}, \Omega_1^z). \quad (11)$$

It can be shown that $$P(\Lambda_1^1 | \Omega_1^z) = 1 - P(\overline{\Lambda_1^1} | \Omega_1^z) \leq 1 - q(1-q)^z \Phi(T), \quad (12)$$

and for every m=2,..., M, $$P(\Lambda_1^m | \Lambda_1^{m-1}, \Omega_1^z) = 1 - P(\overline{\Lambda_1^m} | \Lambda_1^{m-1}, \Omega_1^z) \leq 1 - q(1-q)^z \Phi(T), \quad (13)$$

where q is the signature sparsity and $\Phi(T) = 1-e^{-T}$. This is due to the fact that regardless of $\Lambda_1^{m+1}$, the probability node 1 is eliminated is no less than $q(1-q)^z \Phi(T)$.

Therefore, $P(1 \in \nu_0 | \Omega_1^z) \leq (1-q(1-q)^z \Phi(T))^M$. (14)

As to the second term on the right hand side of (10), the event $\tilde{\Lambda}$ representing that node 1 is eliminated due to the first measurement entry is introduced. Thus, $$P(1 \in V_1 | \Omega_1^z) = M P(\tilde{\Lambda} | \Omega_1^z) \leq \quad (15)$$

$$M_q P\left(\left|\sum_{n=2}^{z+1} \sqrt{\gamma} S_{1n} U_n + W_1\right| < \sqrt{T}\right) \times (1 - q(1-q)^z \Phi(T))^{M-1},$$

where the inequality follows from similar arguments leading to (13). In addition, the probability in (16) can be calculated by averaging over all possible realizations of $S_{1,2}, \ldots, S_{1,z+1}$, $$P\left(\left|\sum_{n=2}^{z+1} \sqrt{\gamma} S_{1n} U_n + W_1\right| < \sqrt{T}\right) = \quad (16)$$

$$\sum_{k=0}^{z} \binom{z}{k} q^k (1-q)^{z-k} P\left(\left|\sum_{n=2}^{k+1} \sqrt{\gamma} U_n + W_1\right| < \sqrt{T}\right) \leq$$

$$(1-q)^z \Phi(T) + (1-(1-q)^z) 2T/(\alpha \eta \gamma).$$

To justify the last inequality, the pdf of $U_n$ is transformed from its polar coordinate system format into its Cartesian coordinate system format. Precisely, for any complex number u, the pdf $$p(u) = \begin{cases} \frac{2}{\alpha \pi} \frac{\eta^{2/\alpha}}{(u_I^2 + u_R^2)^{2/\alpha+1}}, & |u|^2 \geq \eta; \\ 0, & |u|^2 < \eta, \end{cases} \quad (17)$$

Where $u_I$ and $u_R$ denote respectively the imaginary and real part of u. It is easy to see that p(u) admits an upper bound given as $$p(u) \leq \frac{\tilde{2}}{\alpha \pi \eta}.$$

When k=0, the probability is given by $\Phi(T)$ When k≥1, $$J \triangleq \left|\sum_{n=3}^{k+1} U_n + \frac{W_1}{\sqrt{\gamma}}\right|, \quad (18)$$

and $$P\left(\left|\sum_{n=2}^{k+1} \sqrt{\gamma} U_n + W_1\right| < \sqrt{T}\right) = \quad (19)$$

$$EP\left(|U_2 + J| < \frac{\sqrt{T}}{\sqrt{\gamma}} \mid J\right) \le E\left\{E\left\{\frac{2}{\alpha \pi \eta} \frac{\pi T}{\gamma} \mid J\right\}\right\} = \frac{2T}{\alpha \eta \gamma}$$

which justifies (16). Therefore, (10) can be expanded as $$P_f \le \frac{N}{c} \sum_{z=0}^{N-1} G(z) \bigg[ (1 - q(1-q)^z \Phi(T))^M + \quad (20)$$

$$\left((1-q)^z \Phi(T) + (1-(1-q)^z) \frac{2T}{\alpha \eta \gamma}\right) \times Mq(1-q(1-q)^z \Phi(T))^{M-1}\bigg].$$

Since for any $0 \le a \le 1$ and $b \ge 1$, $(1-a)^b \ge 1-ab$ and $(1-a)^b \le e^{-ab}$, $P_f$ from (20) can be upper bounded by $$P_f \le \frac{N}{c} \sum_{z=0}^{N-1} G(z) \bigg[ e^{-Mq(1-zq)\Phi(T)} + \quad (21)$$

$$\left((1-q)^z \Phi(T) + (1-(1-q)^z) \frac{2T}{\alpha \eta \gamma}\right) \times Mqe^{-(M-1)q(1-zq)\Phi(T)}\bigg].$$

Furthermore, noting that $(1-(1-q)^z) \le 1$ and $e^{q(1-zq)\Phi(T)}$, $P_f$ can be bound from above by extending (21) as $$P_f \le \frac{N}{c} e^{-Mq\Phi(T)} \sum_{z=0}^{N-1} G(z) \bigg[\left(1 + \frac{2MqT}{\alpha \eta \gamma} e^{q\Phi(T)}\right) e^{zMq^2\Phi(T)} + \quad (22)$$

$$Mq\Phi(T) e^{q\Phi(T)} \left[e^{Mq^2\Phi(T)}(1-q)\right]^z\bigg].$$

Lastly, substituting (1—q) with its upper bound 1 in (22) and summing over the z's gives $$cP_f \le Ne^{-Mq\Phi(T)} \bigg[1 - \frac{c}{N} + \frac{c}{N} e^{Mq^2\Phi(T)}\bigg]^{N-1} \times \quad (23)$$

$$\left(1 + \frac{2MqT}{\alpha \eta \gamma} e^{q\Phi(T)} + Mq\Phi(T) e^{q\Phi(T)}\right).$$

Apply the inequality that for any number a and b>0, $(1+a)^b \le e^{ab}$ to (23), the upper bound (5) can be proved.

In another embodiment, fast and efficient discovery of all neighboring nodes by each node is useful to the deployment of wireless networks. One technique is to have all or substantially all neighbors send pseudo-random on-off signatures simultaneously upon receipt of a query signal or spontaneously according to a predetermined schedule.

In another embodiment, deterministic signatures are assigned to nodes. The signatures are basically codewords from a second-order Reed-Muller code. One advantage of the scheme is that real-time discovery is feasible even if the number of nodes or the number of possible network interface addresses is several billion or more.

In a typical wireless network, each node is given one or more unique physical addresses to identify its network interface(s). An example is a peer-to-peer network which uses IP addresses to identify nodes in the network. In order to send data across in a wireless network, it is crucial that each communicating party acquires the network interface addresses of its communicating peers in its neighborhood, with which the node has a direct link.

In one embodiment, deterministic signatures based on second-order Reed-Muller codes are used. One advantage of such signatures is that the corresponding chirp decoding algorithm has sub-linear complexity, which allows practical, efficient discovery even if the NIA space is $10^{30}$ or larger.

In one embodiment, up to $2^{65}$ nodes can be supported by assigning each node a unique signature of length 1,024. The chirp reconstruction algorithm is applied for a query node to recover its neighborhood based on the observations.

As a non-limiting example, a system has $2^{20}$ nodes, each of which is assigned a signature of length 1,024. Numerical results show that efficient discovery is feasible using the disclosed scheme.

In another embodiment, deterministic signatures based on second-order Reed-Muller (RM) codes are used to overcome the scalability problem. RM signatures form excellent measurement matrices which satisfy the restricted isometry property (RIP) statistically. Due to their group structure, the decoding complexity is sublinear in N and feasible for networks of any practical size, e.g., with M=1,024, decoding is viable for a network of N=$2^{65}$ distinct signatures.

Unfortunately, the RM signatures consist of QPSK symbols, which does not allow a node to transmit and measure the channel at the same time, thus prohibiting full-duplex discovery. To overcome the lack of full-duplex discovery, RM signatures are converted to on-off signals by introducing 50% erasures, so that each node emits energy over half of its slots, and make measurements over the remaining half. This allows neighbors to observe about 25% of each others' on-slots (this is the maximum). Numerical results indicate that reliable half-duplex discovery is achievable for a network of $2^{20}$ nodes, where the neighborhood size is on average 50, at SNRs well below 10 dB, using signatures of merely 1,024 symbols. Moreover, the performance degrades with up to 25% erasures, which can be compensated for by proportionally longer signatures.

Generally, in order to decode the messages from the neighboring nodes, not only are their signatures acquired, but also their timing (or relative delay). Timing acquisition and decoding are generally easier if the frames arriving at a receiver are fully synchronous locally within each neighborhood. Synchronization is, however, not a necessity. Synchronous or not, each node collects essentially the same amount of information through its own off-slots.

Synchronicity may be maintained in cellular networks and sensor and ad hoc networks. Various distributed algorithms for reaching consensus can be applied to achieve local synchronicity, e.g., by having each node shift its timing to the "center of gravity" of the timings of all nodes in the neighborhood. One RODD slot is typically much longer than the propagation delay across the diameter of a neighborhood. For example, a slot interval of 100 μs would be 100 times the propagation time of 1 μs over a 300-meter range. One may simply use some beacon signal as a common reference. One possible shortcut is to have all nodes synchronized using GPS or via listening to base stations in an existing cellular network, if applicable. A synchronous design generally simplifies timing acquisition, detection and decoding, but to maintain synchronicity in a dynamic network generally requires extra overhead.

In an asynchronous design, the relative delay can be arbitrary, so that the off-slot of a node is in general not aligned with the on-slot of its neighbors. Decoding asynchronous signals may be applied to multiuser detection/decoding.

The algorithms for timing acquisition and synchronization should account for the fact that an active node can only observe each frame partially through its off-slots. To infer about the delays of neighbors based on partial observations is fundamentally the filtering of a hidden Markov process. The accuracy of synchronicity generally depends on two factors: channel impairment and propagation delay.

Many advanced wireless transmission techniques require knowledge of the state of communicating parties, such as the power, modulation format, beamforming vector, code rate, ACK, queue length, etc. Conventional schemes often treat such network state information similarly as data, so that exchange of such information requires a substantial amount of overhead. In a highly mobile network, the overhead easily dominates the data traffic. RODD is suitable for nodes to efficiently broadcast local state information to their respective neighbors. In one embodiment, RODD may be deployed as a new sub-layer of the protocol stack, devoted to (virtual full-duplex) state information exchange. In another embodiment, RODD may assist distributed scheduling by letting each node choose whether to transmit based on its own state and the states of its neighbors. In yet another embodiment, RODD is applied to distributed interference management by exchanging interference prices.

A brief discussion of how neighbor discovery is triggered follows. If a single node (e.g., a new corner) is interested in its neighborhood, it may send a query message, so that only the neighbors which can hear the message will respond immediately. To implement network-wide discovery, nodes can be programmed to simultaneously transmit their on-off signatures at regular, pre-determined time instants, so that all nodes discover their respective neighbors. This way neighbor discovery does not interfere with data transmission.

A further example comprises: distributing a number of wireless communication devices over a region, the devices each having a different one of a number of device identifiers, the device identifiers each corresponding to a time-varying energy pattern relative to a sequence of time intervals; selecting one of the devices to determine, a first subset of the devices being within a transmission range the one of the devices and a second subset of the device being outside the transmission range of the one of the devices; with the one of the devices, prompting wireless transmission of the device identifiers from the devices; providing a representation of a combination of the device identifiers received by the one of the device from each of the first subset of the devices; for each of the time intervals, processing the representation to determine if a received energy level satisfies a test criterion; and determining the devices in the second subset in accordance with the processing of the representation.

Still another example is directed to a system including a number of wireless communication device distributed over a selected region, the devices each having a different one of a number of device identifiers, and the device identifiers each corresponding to a time-varying energy pattern relative to a sequence of time intervals. Also included is means for selecting one of the devices to determine a first subset of the devices being within a communication range of the one of the devices and a second subset of the device being outside the communication range of the one of the devices; with the one of the devices, means for prompting wireless transmission of the device identifiers from the devices; means for providing a representation of a combination of the device identifiers received by the one of the device from each of the first subset of the devices; means for processing the representation to determine if a received energy level satisfies a test criterion for each of the time intervals; and means for determining the devices in the second subset in accordance with the processing of the representation.

Another example includes: providing a number of wireless communication nodes spaced apart form one another over an area; initiating concurrent identifier transmissions to a designated one of the nodes from other of the nodes; with the designated one of the nodes, detecting the concurrent identifier transmissions from the other nodes; and identifying a subset of the nodes neighboring the designated one of the nodes by excluding each of the nodes for which an identifier is not indicated by the concurrent identifier transmissions.

Yet another is directed to a system including a number of wireless communication nodes spaced apart form one another over an area. Also included are means for initiating concurrent identifier transmissions to a designated one of the nodes from other of the nodes; means for detecting the concurrent identifier transmissions from the other nodes; and means for identifying a subset of the nodes neighboring the designated one of the nodes by excluding each of the nodes for which an identifier is not indicated by the concurrent identifier transmissions.

A further example is directed to a system, comprising: a number of wireless communication nodes spaced apart from one another, at least one of the nodes including: an antenna; a transmitter operatively coupled to the antenna; a receiver operatively coupled to the antenna; and a processing device coupled to the transmitter and the receiver, the processing device being structured to transmit an output signal to prompt transmission of unique signatures from other of the nodes to determine a subset of neighboring nodes, the processing device having access to the signatures of each of the nodes, generating a representation that combines each one if the signatures transmitted in response to the output signal, the processing device being structured to compare the representation to the signatures of each of the nodes to determine the neighboring nodes by eliminating non-neighboring nodes.

In another example, an apparatus comprises: a wireless communication device including a processing device with operating logic to establish a wireless communication network with a number of other wireless communication devices, the operating logic being executable by the processing device to: prompt concurrent identifier transmissions from other wireless communication devices, receive the concurrent identifier transmissions from at least some of the other devices, and compare the concurrent identifier transmissions to a known set of identifiers for the other wireless communication devices to identify a subset of the devices neighboring the device.

In still a further example, an apparatus comprises: means for wirelessly transmitting a query signal from one node to each of a number of other nodes; means for receiving any simultaneous responses to the query signal from the other nodes; and means for processing the content of the simultaneous responses relative to a sequence of time intervals and information representing a unique identifier for each of the other nodes to identify a subset of the other nodes neighboring the one node.

Any experimental (including simulation) results are exemplary only and are not intended to restrict any inventive aspects of the present application. Any theory, mechanism of operation, proof, or finding stated herein is meant to further enhance understanding of the present application and is not intended to make the present application in any way dependent upon such theory, mechanism of operation, proof, or finding. Simulations of the type set forth herein are recognized by those skilled in the art to demonstrate that methods, systems, apparatus, and devices, are suitable for their intended purpose. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any claims that follow are desired to be protected.

What is claimed is:

1. A method, comprising:
   distributing a number of wireless communication devices over a region, the wireless communication devices each having a different one of a number of device identifiers, the device identifiers each corresponding to a time-varying energy pattern relative to a sequence of time intervals;
   selecting one of the wireless communication devices to determine, a first subset of the wireless communication devices being within a wireless communication range of the one of the wireless communication devices and a second subset of the wireless communication devices being outside the wireless communication range of the one of the wireless communication devices;
   with the one of the wireless communication devices, prompting wireless transmission of the device identifiers from the wireless communication devices;
   providing a representation of a combination of the device identifiers received by the one of the wireless communication devices from each of the first subset of the wireless communication devices;
   for each of the time intervals, processing the representation of the combination of the device identifiers to determine if a received energy level satisfies a test criterion; and
   determining the wireless communication devices in the second subset in accordance with the processing of the representation of the combination of the device identifiers.

2. The method of claim 1, which includes determining which wireless communication devices belong in the first subset in accordance with the processing of the representation.

3. The method of claim 1, wherein the test criterion includes an energy level threshold and the determining of the wireless communication devices includes the received energy level being below the energy level threshold for more than two of the time intervals.

4. The method of claim 1, wherein the representation is binary with one binary state representing the energy level satisfying the test criterion and another binary state for the energy level not satisfying the test criterion.

5. The method of claim 4, wherein the processing of the representation includes performing group testing with multiple bins and which includes:
   defining an ad hoc network with the wireless communication devices; and
   moving the wireless communication devices relative to one another in a mobile application.

6. The method of claim 1, which includes establishing a communication network with the wireless communication devices based on the determining of at least one of the wireless communication devices in the second subset and the first subset.

7. The method of claim 1, wherein the wireless communication devices each include a processing device, a transmitter, and a receiver.

8. The method of claim 1, wherein the first subset numbers no more than one hundredth of the number of wireless communication devices distributed over the region.

9. The method of claim 1, wherein the first subset numbers no more than one thousandth of the number of wireless communication devices distributed over the region.

10. A method, comprising:
    providing a number of wireless communication nodes spaced apart from one another over an area;
    initiating concurrent identifier transmissions to a designated one of the wireless communication nodes from others of the wireless communication nodes;
    with the designated one of the wireless communication nodes, detecting the concurrent identifier transmissions from the other wireless communication nodes; and
    identifying a subset of the wireless communication nodes neighboring the designated one of the wireless communication nodes by excluding each of the wireless communication nodes for which an identifier is not indicated by the concurrent identifier transmissions.

11. The method of claim 10, which includes defining an ad hoc network with the wireless communication nodes.

12. The method of claim 10, wherein the identifiers each correspond to a unique energy-varying pattern relative to a sequence of time slots and wherein the step of identifying includes the step of comparing an energy level test criterion for each of the time slots in the sequence of time slots to determine which of the wireless communication nodes to exclude from the identified subset of the wireless communications nodes.

13. The method of claim 12, wherein the step of identifying includes the step of generating a representation of the concurrent identifiers that correspond to a sequence of bits each for a respective one of the time slots in the sequence of time slots, with one binary state of one of the bits representing the energy level satisfying the test criterion and another binary state of the one of the bits representing the energy level does not satisfy the test criterion.

14. The method of claim 13, wherein the representation has at least five different time slots in the sequence of time slots that fail to satisfy the test criterion for each of the wireless communication nodes excluded.

15. The method of claim 10, wherein the number of wireless communication nodes identified in said step of identifying a subset of the wireless communication nodes is no more than one thousandth of the number of wireless communication nodes provided in said step of providing a number of wireless communication nodes.

16. The method of claim 10, wherein the steps of initiating concurrent identifier transmissions to a designated one of the wireless communication nodes, and identifying a subset of wireless communication nodes are performed during a single frame interval.

17. A system, comprising: a number of wireless communication nodes spaced apart from one another, at least one of the wireless communication nodes including:
an antenna;
a transmitter operatively coupled to the antenna;
a receiver operatively coupled to the antenna; and
a processing device coupled to the transmitter and the receiver, the processing device being structured to transmit an output signal to prompt transmission of unique signatures from other of the wireless communication nodes to determine a subset of neighboring wireless communication nodes, the signatures each correspond to a unique energy-varying pattern relative to a sequence of time slots, the processing device having access to the signatures of each of the wireless communication nodes, generating a representation that combines each one of the signatures transmitted in response to the output signal, the representation provides a combination of the signatures relative to the time slots, the processing device being structured to compare the representation to the signatures of each of the wireless communication nodes to determine the neighboring wireless communication nodes by eliminating non-neighboring wireless communication nodes, the processing device includes means for processing the representation by comparing an energy level test criterion for each of the time slots of the time slots to determine which of the wireless communication nodes to exclude from the subset.

18. The system of claim 17, wherein the processing device includes means for binning information received in response to the output signal over a number of bins.

19. The system of claim 17, wherein the representation corresponds to a sequence of binary bits with one of the bits for each of the time slots, one binary state of each of the bits representing that the test criterion is satisfied and another binary state of each of the bits representing that the test criterion is not satisfied for a respective one of the time slots.

20. The system of claim 19, wherein the processing device includes means for excluding non-neighboring wireless communication nodes that correspond to two or more of the bits failing the test criterion.

21. A method, comprising:
providing a number of wireless communication nodes spaced apart from one another over an area;
initiating signature transmissions to a designated one of the wireless communication nodes from other of the wireless communication nodes;
with the designated one of the wireless communication nodes, detecting the signature transmissions from the other wireless communication nodes; and
identifying a subset of the wireless communication nodes neighboring the designated one of the wireless communication nodes based on the signature, wherein the signature is a second order Reed-Muller code.

22. The method of claim 21, wherein a length of the signature is less than or equal to 8,192 symbols.

23. The method of claim 22, wherein a length of the signature is less than or equal to 4,096 symbols.

24. The method of claim 23, wherein a length of the signature is less than or equal to 1024 symbols.

25. The method of claim 21, wherein a length of the signature is greater than or equal to 8,192 symbols.

26. The method of claim 21, wherein the wireless communication nodes form an ad hoc network.

27. The method of claim 21, wherein the wireless communication nodes form a synchronous timing network.

28. The method of claim 21, wherein the signature is converted to on-off signals by introducing 50% erasures.

29. The method of claim 21, further comprising:
with each wireless communication node, emitting energy over approximately half of its slots and taking measurements over the remaining slots; and
with each wireless communication node, observing approximately 25% of the other wireless communication nodes' on-slots.

30. A method, comprising:
providing a number of nodes in an area, wherein each node has a unique signature;
identifying a subset of the nodes based on applying a first discovery process when the number of nodes is at or below a value or a second discovery process when the number of nodes is above the value;
with the first discovery process, identifying the subset of nodes based on the signature, wherein the signature corresponds to a unique energy-varying pattern relative to a sequence of time slots and the signatures are transmitted concurrently; and
with the second discovery process, identifying the subset of nodes based on the signature, wherein the signature is a second-order Reed-Muller code.

31. The method of claim 30, further comprising:
in the second discovery process, emitting energy over approximately half of its slots and taking measurements over the remaining slots.

32. The method of claim 30, wherein the value is one billion.

33. The method of claim 30, wherein the value is ten thousand.

* * * * *